United States Patent [19]

Mangulis et al.

[11] Patent Number: 4,617,674
[45] Date of Patent: Oct. 14, 1986

[54] SYNCHRONIZING SYSTEM FOR SPREAD SPECTRUM TRANSMISSIONS BETWEEN SMALL EARTH STATIONS BY SATELLITE VIA AN INTERMEDIATE HOP TO A LARGE EARTH STATION

[75] Inventors: Visvaldis Mangulis, E. Brunswick; Leonard N. Schiff, Lawrenceville, both of N.J.

[73] Assignee: RCA Corporation, Princeton, N.J.

[21] Appl. No.: 513,737

[22] Filed: Jul. 14, 1983

[51] Int. Cl.[4] .............................................. H04J 3/06
[52] U.S. Cl. ..................................... 375/1; 375/107; 375/111; 370/104
[58] Field of Search ....................... 375/1, 34, 58, 107, 375/108, 109, 111, 114, 118; 455/12, 51; 370/103, 104; 343/7.5

[56] References Cited

U.S. PATENT DOCUMENTS

| | | | |
|---|---|---|---|
| 3,789,142 | 1/1974 | Shimasaki et al. | 375/107 |
| 3,982,075 | 9/1976 | Jefferis et al. | 375/107 |
| 4,001,690 | 1/1977 | Mack et al. | 375/107 |
| 4,004,225 | 1/1977 | Gänssmantel | 375/107 |
| 4,135,156 | 1/1979 | Sanders, Jr. et al. | 455/12 |
| 4,193,030 | 3/1980 | Rabow et al. | 375/2 |
| 4,230,989 | 10/1980 | Buehrle | 375/58 |
| 4,231,114 | 10/1980 | Dolikian | 455/49 |
| 4,270,211 | 5/1981 | Schlichte | 375/107 |

OTHER PUBLICATIONS

"Spread Spectrum Communications", (Code Division Multiple Access), IEEE Transactions on Communications, vol. COM-30, No. 5, May 1982, p. 70.

Primary Examiner—Robert L. Griffin
Assistant Examiner—Raymond C. Glenny
Attorney, Agent, or Firm—Joseph S. Tripoli; Robert L. Troike; William H. Meise

[57] ABSTRACT

A communication system comprising a satellite, a master earth station (MES), and a plurality of small earth stations (SESs) provides signal transmissions addressed and transmittable to a selectable other SES via the satellite, the MES, and then the satellite again. The signal transmissions consist of bit representing pseudo random sequence (PRS) signals $PRS_{SES}$ which in turn consist of chips arranged in predetermined and identifiable patterns and with the bit and chip occurrence rates $C_{SES}$ and $B_{SES}$ of each SES being synchronized with each other as they arrive at the MES. The satellite responds to the signal transmissions from the SESs to retransmit the signal transmissions to the MES, which in turn responds to the signal transmissions from the satellite to amplify and retransmit such signal transmissions back to the satellite again. The satellite again responds to the signal transmissions from the MES to retransmit them to the SESs. The MES and SESs further include apparatus to maintain synchronism between the chip and bit rates of the $PRS_{SES}$ signals as they arrive at the MES.

6 Claims, 15 Drawing Figures

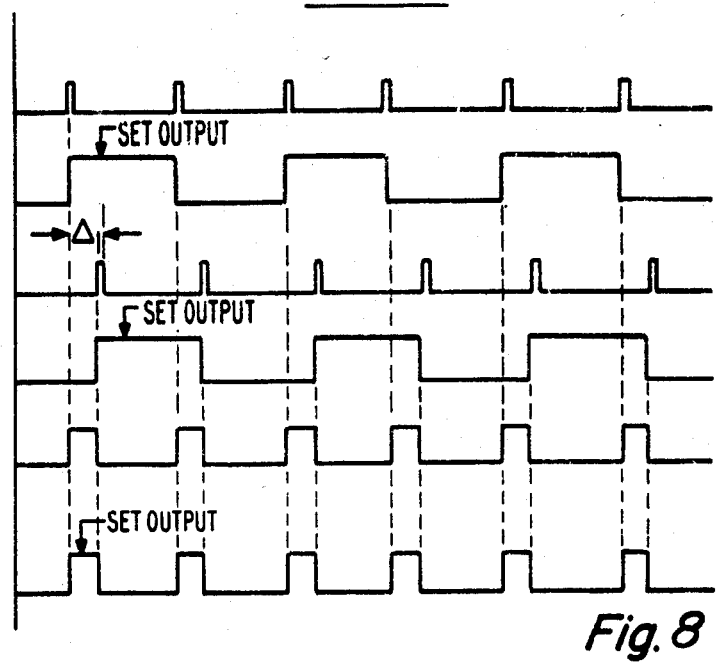
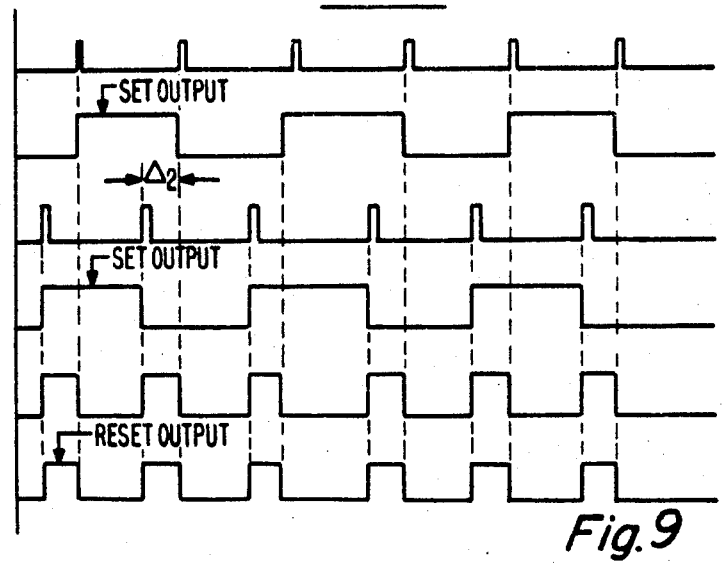

SYNCHRONIZING SYSTEM FOR SPREAD SPECTRUM TRANSMISSIONS BETWEEN SMALL EARTH STATIONS BY SATELLITE VIA AN INTERMEDIATE HOP TO A LARGE EARTH STATION

This invention relates generally to communications systems employing a plurality of earth stations and a common satellite transponder and more particularly to such a system employing spread spectrum transmissions which are all synchronized with each other from a common source located preferably at a master earth station and observable to all other stations by monitoring the satellite transponder.

In prior art systems earth stations can transmit data signals to remote earth stations via a satellite transponder. Similarly, earth stations can receive transmissions from distant earth stations via a satellite. In these systems many earth stations access the same satellite transponder so that the transponder is being used in a multiple access mode. In the prior art, several multiple access techniques are available. The two techniques now most commonly employed are time division multiple access (TDMA) and frequency division multiple access (FDMA). In a system using relatively small earth station antennas, (from 3-4 feet in diameter) both of the foregoing techniques present substantial difficulties. The basic problem with both TDMA and FDMA lies in their interference protection. Small earth stations (SESs) of the intended size experience substantial interference on reception and also on transmission both in terms of interfering with other services or being interfered with because the small antenna size implies low antenna selectivity, i.e., the bore sight radiated power relative to the off-axis radiated power.

In a TDMA system the data to be transmitted is buffered and then radiated in bursts during a relatively short time interval or window on a periodic basis. Consequently, the average power over the entire period may be low because most of the times no transmission occurs. However, during the narrow time windows, when data is being transmitted, the power is relatively high.

In FDMA, the data is transmitted continuously, but since the radiated signal is confined to a small section in a frequency band (so that others can use adjacent bands) the power is concentrated in portions of the frequency spectrum rather than in time as is the case with TDMA transmission.

Hence, especially in terms of the interference potentials from the earth station into other terrestrial services or to adjacent satellites, the concentration of transmitter power in either the time or frequency domains produces undesirable results. On the other hand, spread spectrum transmission has a unique distinction in that the power is not concentrated in either time or frequency. Many users can use the same bandwidth simultaneously in the spread spectrum multiple access mode (SSMA). The power produced by a spread spectrum transmitter is relatively constant over time and is spread out over a large frequency range. Depending upon how large such frequency range is the actual level of any given signal can be lower than the thermal noise received at a given receiver which might interfere with the spread spectrum transmission. Hence, spread spectrum is an extremely desirable modulation method for multiple access of small earth stations.

The spread spectrum transmission employed in the present invention is the so-called direct sequence method. In the direct sequence method, a bit of information (data bit) is transmitted as a phase shift keyed transmission of a carrier with the phase shift keying being at an extremely rapid rate compared to the data bit rate since there are many time elements per bit. These time elements are conventionally called chips. The signal transmitted in the direct sequence method technique has a unique shift register pattern associated with it, usually called a pseudo random sequence (PRS). The PRS signal is a sequence of high and low level signals defined by the chips, with each chip being of equal time length, arranged in a random fashion, and representing the phase shifting of the carrier. If a binary 1 is to be transmitted the uninverted PRS signal is employed to modulate the carrier. If a binary 0 is to be transmitted the inverted PRS signal modulates the carrier.

In a typical application of the direct sequence method employing a PRS signal there might be 500-1000 chips in the PRS pattern. The bandwidth occupied by the signal is directly determined by the chip rate which is, in effect, a pseudo data rate. A receiver receiving a PRS signal from a given transmitter has the same PRS pattern stored therein. This stored PRS pattern can be employed to decode and extract the transmitted data even when there are many other stations using the same frequency band at the same time because the other stations are all using PRS signals of different patterns.

While the spread spectrum technique is extremely desirable from the point of view of reducing interference probability from a transmitting station and also from the point of view of reducing interference potential on reception, the efficiency of multiple access spread spectrum as it is conventionally used, i.e., with each station being asynchronous with each other station, is quite low compared with either TDMA and FDMA. In both TDMA and FDMA the signals transmitted by the individual stations are orthogonal to one another, i.e., they either occur at different times or in different frequency bands.

In known asynchronous spread spectrum systems the transmitted waveforms are not orthogonal to each other so that any given station receiving a desired spread spectrum transmission from another station (after despreading with the correct PRS) will also receive some fraction of the other spread spectrum transmissions. If there are many such other transmissions, those fractions will add up to a considerable amount of interference which limits the SSMA system capacity to a value much less than the TDMA or FDMA system capacity. Consequently, it is desirable to synchronize the spread spectrum transmissions and to make the waveforms orthogonal. If that is done then the despreading operation with one PRS eliminates the other spread spectrum transmissions which have different PRSs because the PRSs are chosen from an orthogonal set.

One could have a system in which synchronized orthogonal signals are transmitted via satellite from one small earth station (SES) to another SES in a single hop. However, if the SESs are very small and do not have much power, then it might be advantageous to accomplish the transmission in two hops. In the first hop a SES transmits via satellite to a large master earth station (MES), and in the second hop the MES transmits that signal via satellite to the receiving SES. In essence the MES acts as a signal amplifier.

A general two-hop system which requires a relatively large amount of equipment will be described first. The present invention consists of an improvement on such a general system so as to reduce the amount of equipment.

In the general system, there is a MES and a satellite. Each of the SESs transmits a signal via the satellite to the MES which transmits the signal back to the satellite and to the intended destination of the SES. Further, in such a system, each of the SESs contains three receivers. The first receiver is for receiving a transmission from another SES via the satellite and the MES. The second receiver is for receiving a master PRS signal via the satellite from the MES where it is generated. The third receiver at each SES is to receive a PRS signal generated at the SES and retransmitted back from the satellite. Each of the SESs will compare the phase of the master PRS signal with the particular reference PRS signal that the SES transmitted in order to determine and maintain phase synchronization between the master PRS signal and the reference PRS signal transmitted by the SES.

If such synchronization is maintained between the master PRS and the reference for each SES then synchronization between all transmitted PRS signals will be maintained for each of the SESs, as seen by each such SES.

The use of the MES to retransmit to a second small station a given signal received from a first SES via the satellite enables the system to amplify the signal for retransmission to the receiving second SES and thereby assure greater integrity in the system. It is not desirable to amplify the signal in the satellite because of the limited capacity of the satellite.

However, such a system does require a transmitter and three receivers located at each SES and one transmitter and one receiver for each of the SESs located at the MES, plus one additional transmitter at the MES to transmit the signal to which the SESs synchronize. Thus, there is required a total of 2N+1 transmitters and 4N receivers in a system having N SESs. There could be even more receivers in the system if some SESs listen to more than one SES.

It is a primary purpose of the invention to provide a spread spectrum satellite transmission system in which the number of receivers in the system is substantially reduced with no significant degradation of system performance. More specifically, the present invention requires only 2N+1 transmitters and 2N+1 receivers in a system having N SESs.

In a preferred form of the invention there is provided a communication system comprising a satellite, a master earth station (MES), and a plurality of small earth stations (SESs) each comprising first logic means for generating signal transmissions addressed and transmittable to a selectable other SES via the satellite, the MES, and then via the satellite again. The signal transmissions consist of bits representing pseudo random sequence (PRS) signals $PRS_{SES}$ which in turn consist of chips arranged in predetermined and identifiable patterns with the chip and bit occurrence rates $C_{SES}$ and $B_{SES}$ of each SES beig synchronized with each other as they arrive at the MES. The satellite further comprises logic means responsive to the signal transmissions from the SESs to retransmit such signal transmissions to the MES which in turn responds thereto to amplify and retransmit the signal transmissions back to the satellite. The satellite comprises second logic means responsive to the signal transmissions from the MES to retransmit the signal transmissions to the SESs. The MES and the SESs further comprise cooperative logic means to maintain synchronism between the chip and bit rates of the $PRS_{SES}$ signals as they arrive at the MES.

FIGS. 8A–8F and 9A–9F are timing diagrams illustrating the phase corrections made to the PRS signals generated at the various SESs;

The inventive improvement described herein which allows synchronization of transmissions from various SESs is used in conjunction with conventional spread spectrum transmitters and receivers. It is advantageous, therefore, to first describe a prior art spread spectrum transmitter and receiver.

Figure 1:
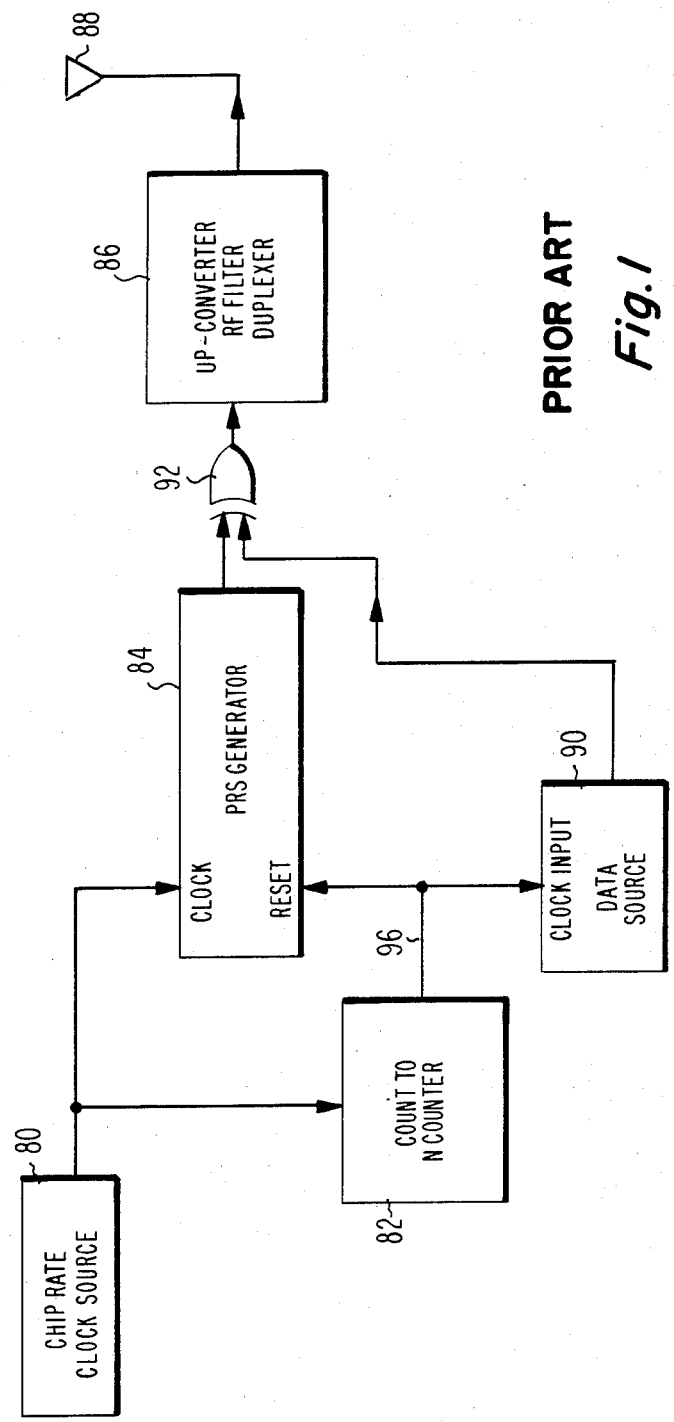
FIG. 1 is a block diagram of a prior art transmitter located at a given SES.
Figure 2:
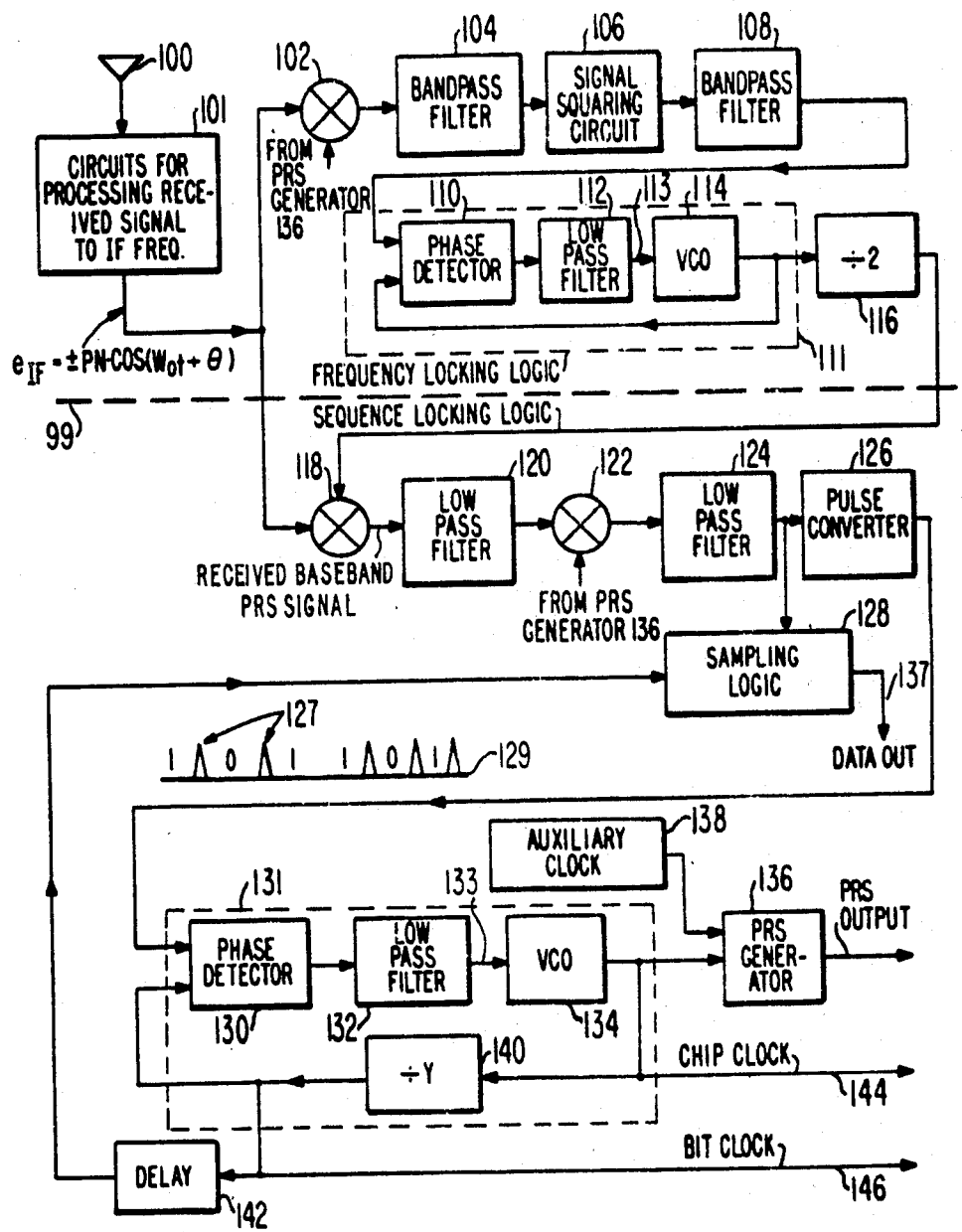
FIG. 2 is a block diagram of a prior art receiver located at a given SES.

A prior art transmitter portion is shown in FIG. 1 and a prior art receiver in FIG. 2. The transmitter logic of FIG. 1 is relatively simple and consists primarily of a chip rate clock source 80 which supplies clock pulses to counter 82 and to PRS generator 84 which in turn iteratively generates a predetermined PRS signal having a predetermined pattern. Such PRS signal is supplied to one input of Exclusive OR (XOR) gate 92. The bit output of data source 90 is supplied to the other input of XOR gate 92. Synchronization between the output of data source 90 and PRS generator 84 is maintained by the count-of-0 output from counter 82. Depending upon whether a binary 0 or a binary 1 (low or high level signals) is supplied from data source 90 the XOR gate 92 will either invert or not invert the PRS signal supplied from PRS generator 84, thus indicating an encoded binary 0 or binary 1. The output of XOR gate 92 is supplied to block 86 which processes the signal for transmission.

A portion of a prior art receiver is shown in FIG. 2. A transmitted PRS signal is received via antenna 100 and supplied to circuits within block 101 for processing such received signal down to the IF frequency. The received signal can then be defined by the following expression.

$$e_{IF} = \pm PN \cos(\omega_0 t + \theta) \qquad \text{(Exp. 1)}$$

where $\pm$ PN is the PRS signal modulated by one data bit which is either $+1$ or $-1$ and the expression $\cos(\omega_0 t + \theta)$ is the intermediate carrier frequency portion of the signal at that point in the system.

The signal of Exp. 1 is supplied to one input of mixer 102, while the other input, which receives the locally generated PRS signal, is assumed to have the same pattern as the received PRS signal.

The function of mixer 102 is to strip off the PRS signal from the received IF signal. Next, to remove the unwanted frequency components, the output of mixer 102 is passed through bandpass filter 104 and subsequently squared in squaring circuit 106 to eliminate the negative component of the received signal. This provides a doubled frequency signal defined by the following expression:

$$\cos(2\omega_0 t + 2\theta) \qquad \text{(Exp. 2)}$$

The signal of Exp. 2 is then supplied to one input of phase detector 110 of phase locked loop (PLL) system 111, the output of phase detector 110 being supplied through low pass filter 112 to the frequency control input 113 of VCO 114. To complete the loop the output of VCO 114 is supplied back to the other input of phase detector 110. The function of the PLL is to provide a filter, i.e., to generate an output signal from VCO 114 having a very narrow bandwidth. To obtain the original frequency, the output of VCO 114 is divided by 2 in frequency divider 116 and then supplied to one input of a second mixer 118, the other input thereof receiving the IF input signal (Exp. 1) from source 101.

It should be noted that the portion of FIG. 2 just described, which is the logic just above the dashed line 99, is essentially a frequency locking circuit to produce the frequency supplied to the input of mixer 118 from divider 116. The logic below the dotted line 99 is the sequence locking logic and, as will be seen later, provides chip clock pulses on output lead 144 and bit clock pulses on output lead 146.

The function of mixer 118 is to strip the intermediate carrier frequency $\cos(\omega_0 t + \theta)$ from the supplied signal (Exp. 1), leaving only the received baseband PRS signal plus some undesired frequencies which are removed by low pass filter 120. Such baseband PRS signal is then supplied to one input of mixer 122, with the locally generated PRS signal being supplied to the other input of mixer 122. It should be noted that the locally generated PRS signal supplied to mixer 122 is the same locally generated PRS signal supplied to mixer 102.

As discussed earlier the received PRS signal can be either an uninverted PRS signal or an inverted PRS signal representing respectively a binary 1 or a binary 0. Accordingly, when mixed in mixer 122 with the non-inverted locally generated PRS signal a non-inverted received PRS signal will result in a high-level output signal from mixer 122, and a received inverted PRS signal will result in a low level signal supplied from mixer 122 when mixed with the non-inverted locally generated PRS signal. Thus mixer 122 outputs to low pass filter 124 a series of high and low level signals each having a time duration equal to the time duration of the received PRS signals and representing the bits which were represented by the non-inverted and the inverted PRS signals. Such two-level signal is supplied to low pass filter 124 to remove undesired higher frequencies and is then supplied to a pulse converter 126 which generates a pulse at every transistion from 1 to 0 or 0 to 1. Such transition pulses are designated generally by the reference character 127 in the small timing waveform 129 of FIG. 2. These transition pulses 127 are supplied to one input of phase detector 130, the other input of which receives the output of divide-by-Y circuit 140 which is a portion of a PLL system 131. Another component of PLL 131 is low pass filter 132 which filters the output of phase detector 130 and supplies a frequency control signal to the frequency control 133 input of VCO 134. The output of VCO 134 is supplied through divider 140 which divides the output frequency thereof by Y and supplies such divided down signal frequency to the other input of phase detector 130. Thus, the output of VCO 134 has a frequency which is defined herein as being equal to the chip rate frequency and is, in fact, the chip clock pulse train appearing on output lead 144. Such chip rate clock pulses are supplied to PRS generator 136 which generates the locally generated PRS signal supplied both to mixers 102 and 122. The purpose of the PLL arrangement 131 is to deliver a steady stream of bit and chip pulses since the original input stream of pulses 127 is erratic (a pulse occurs only on transition).

Since Y is the number of chips in a bit the output of the divide-by-Y circuit 140 is at the bit rate and is supplied through delay means 142 back to sampling logic 128 which functions to sample the output of low pass filter 124 at every transition of the output from delay 142. It will be recalled that the output of low pass filter 124 is a two level signal representing the binary 1's and 0's received by the system. Such sampling is required since the transmission of two adjacent 1's or two adjacent 0's at the output of low pass filter 124 are at the same level and difficult to identify. By means of delay circuit 142 and sampling means 128 the nature of each received bit is definitively identified and supplied to a data output lead 137 for use by some appropriate utilization means, not shown.

It is important to note that the chip clock pulses and the bit clock pulses appearing on output terminals 144 and 146 of FIG. 2 are employed in the invention to correct the phase of the chip and bit clock pulses of the signals being transmitted from the particular earth station being considered.

Figure 3:
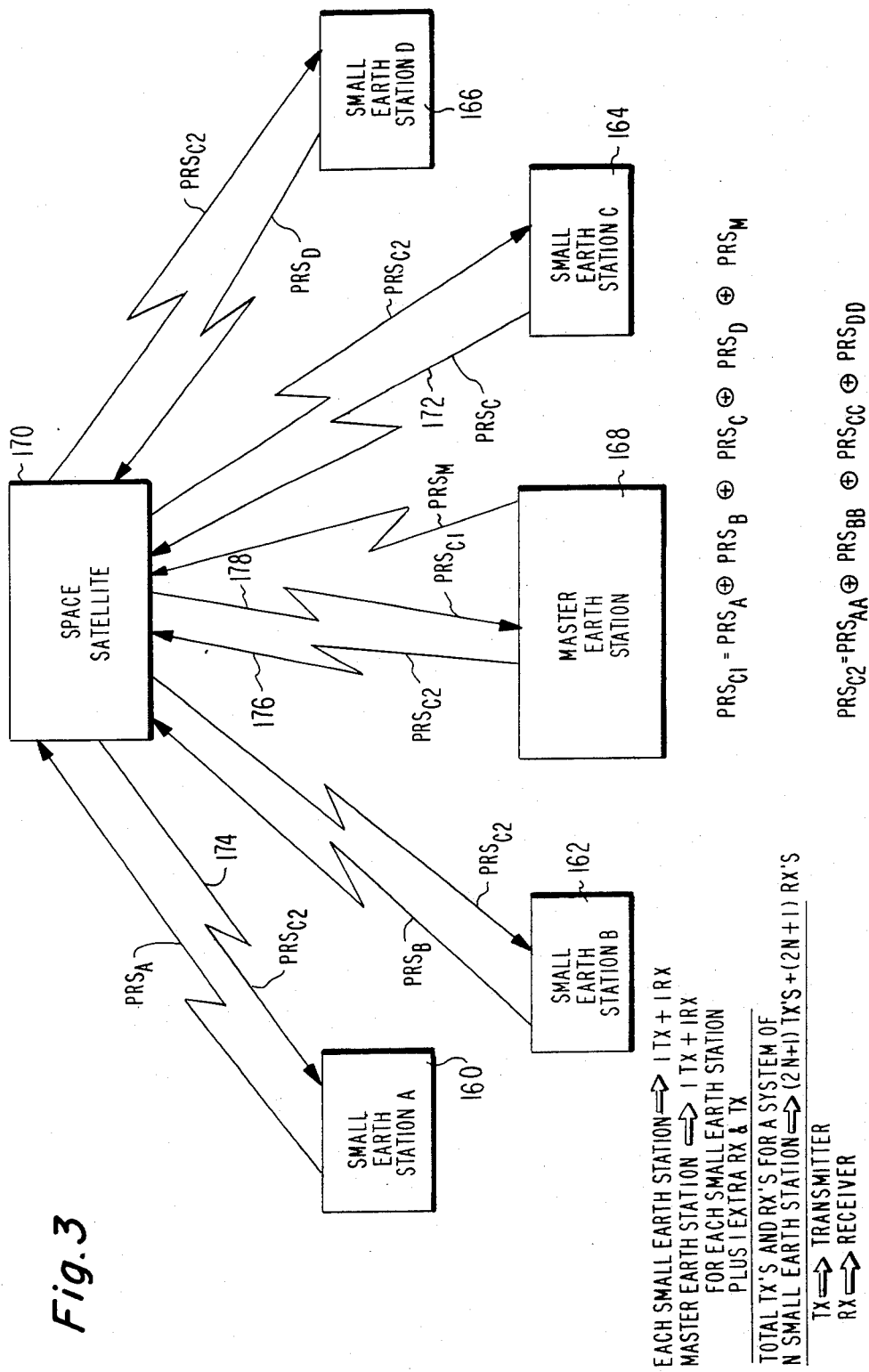
FIG. 3 is a broad block diagram of the overall system in accordance with the present invention.

Reference is now made to the block diagram of FIG. 3 which shows in broad block diagram form the overall basic concept of the invention. In FIG. 3 there is shown four SESs 160, 162, 164 and 166, a single MES 168, and a space satellite 170. Each of the four SESs transmits a pseudo-random sequence (PRS) encoded signal to space satellite 170 from whence it is retransmitted and then detected by MES 168. The signal is then re-encoded and then retransmitted via the satellite to the destination SES.

It will be noted that a transmission from one SES to another via the satellite and the MES is done in two hops, with each hop having a different PRS signal. More specifically, assume the transmission is made from SES C to SES A. The first hop will be from SES C to the satellite and then to the MES with a PRS signal generated by and unique to SES C, say, $PRS_C$. The transmitters of the MES will change the $PRS_C$ signal to another $PRS_{CC}$ signal also unique to SES C but different from the first $PRS_C$ signal. The data will be encoded by the second $PRS_{CC}$ signal in the second hop which will be from the MES to the satellite and then to SES A. SES A will have logic designed to recognize the second $PRS_{CC}$ signal and not the first.

The reason for employing a different PRS signal for each of the two hops in a given transmission is as follows. A higher chip rate can be assigned to the second hop. Such higher chip rate spreads the signal over a wider bandwidth, which gives increased protection against narrowband terrestrial interference.

During the first hop to and from the satellite the SES 164 transmits a signal encoded with a signal $PRS_c$ to the space satellite as indicated by arrow 172. The remaining SESs 160, 162, and 166 each transmits a similar PRS signal, $PRS_A$, $PRS_B$, and $PRS_D$ unique thereto to the space satellite 170. As will be discussed later, the system is synchronized so that all of these PRS signals arrive at the space satellite 170 simultaneously and are then retransmitted to MES 168 in synchronism as represented by the signal $PRS_{C1}$. The MES 168 has N receivers which use $PRS_A$, $PRS_B$, etc., to despread and decode the received composite $PRS_{C1}$ into N data signals, which then are re-spread with different sequences $PRS_{AA}$, $PRS_{BB}$, etc. The MES synchronizes the N new signals and then retransmits the signals at a different carrier frequency as $PRS_{C2}$.

The $PRS_{C2}$ signal is retransmitted with amplification of the signal being provided by MES 168 which could not be provided by space satellite 170 due to the limited capability thereof.

At the end of the second hop each of the SESs receives the $PRS_{C2}$ signal (after retransmission by space satellite 170) with all of the PRS components thereof ($PRS_{AA}$ - - - $PRS_{DD}$) being in synchronism. This $PRS_{C2}$ signal is multiplied by a locally generated PRS signal which is the same as the received second hop PRS signal of the transmitting SES, resulting in the two-level bit stream signal originally transmitted by the transmitting SES.

It is to be noted that in the particular form of the invention being described herein, the protocol is limited so that each SES can communicate only with one other SES, although the system is not restricted to such one-to-one communication. However, for simplicity of discussion consider such a one-to-one system in which SES 160 might communicate only with SES 164 and vice versa, and SES 162 might communicate only with SES 166. SES 160 must contain logic for locally generating the $PRS_{CC}$ which was transmitted by the MES as the second hop of $PRS_C$ from SES 164. SES 160 must be able to decode the incoming PRS signal $PRS_{C2}$ (which includes $PRS_{CC}$) and thereby reconstitute the bit stream represented by the $PRS_{CC}$ component of the incoming $PRS_{C2}$ signal. This will be discussed in more detail later.

System synchronization is initially obtained and then maintained generally in the following manner. Assume a transmitted bit rate of 9600 bits per second. At each SES bits are entered into an appropriate buffer (typically a FIFO) from a data bit source at an average rate of 9600 bits per second and then extracted from the FIFO buffer at a 9600 bit per second rate. However, the bits are in groups of 9500 bits with a pause period having a duration of 100 bit periods existing at the end of each group of 9500 bits. Thus the bit rate is in fact 9600 bits per second.

It is in this 100 bit pause period that the error correction command (ECC) signals, required to acquire and maintain synchronization, are transmitted back and forth at periodic intervals between the SESs and the MES via the satellite. Because each SES will receive messages from only one other SES, it is necessary that the ECC signal required to either acquire or maintain synchronization must be inserted by the MES into the bit stream which will be received by the proper SES. Thus, if SESs 160 and 164 of FIG. 3 form a pair of communicating stations and it becomes evident that the transmission from SES 160 is drifting out of chip synchronization, then the correcting signal must be inserted by the MES into the signal encoded with $PRS_{CC}$, which originates in SES 164. The determination that the transmissions from SES 160 are drifting out of sync is determined at the MES 168 by a comparison of the PRS signal $PRS_A$ from SES 160 with a first hop master PRS signal $PRS_M$ generated by MES 168 and then retransmitted from satellite 170 back to MES 168. Thus, the master PRS signal $PRS_M$ should be in phase synchronization at the MES with all of the first hop PRS signals generated by the SESs.

Once MES 168 has determined that a given SES, such as SES 160, is drifting out of sync, then MES 168 will determine what correction is required and develop an ECC signal therefore. The MES 168 will then wait until it receives the pause period of $PRS_C$ from SES 164 which is asynchronous with the pause period of $PRS_A$ from SES 160. It is to be noted that the pause periods are not synchronous with each other. When the pause period of $PRS_C$ from SES 164 occurs, MES 168 will insert in such pause period the ECC signal (encoded by $PRS_{CC}$) required to correct the phase of the PRS signal $PRS_A$ of SES 160 and then transmit such ECC signal via satellite 170 to SES 160.

SES 160 will receive such ECC signal and make a correction in the phase of its generated first hop PRS signal $PRS_A$. MES 168 will have made a record of the time it transmitted the ECC signal to SES 160. After a sufficient amount of time has elapsed (of the order of 0.8 seconds) to allow for the transit time of the ECC signal back to SES 160 via satellite 170 and then to return via satellite 170 to MES 168, the MES 168 will again check the phase of the first hop PRS signal $PRS_A$ generated by SES 160. If the phase error still exceeds predetermined limits, as will be discussed in connection with FIG. 10, the MES will compute and prepare another ECC signal which will also be transmitted via satellite 170 back to SES 160 during the pause period of the transmission from SES 164, as discussed above.

The foregoing process is continuously carried out to maintain the phase synchronization of SES 160 within predetermined limits. In a similar manner, the phase synchronization of SES 164 is maintained within predetermined limits by computing the phase error by logic contained in MES 168 and then inserting an ECC signal during the pause period of the second hop $PRS_{AA}$ transmission from SES 160 to SES 164. A similar technique of acquiring and maintaining phase synchronization of the pair of communicating small SESs 162 and 166 is employed in the system.

Figure 4:
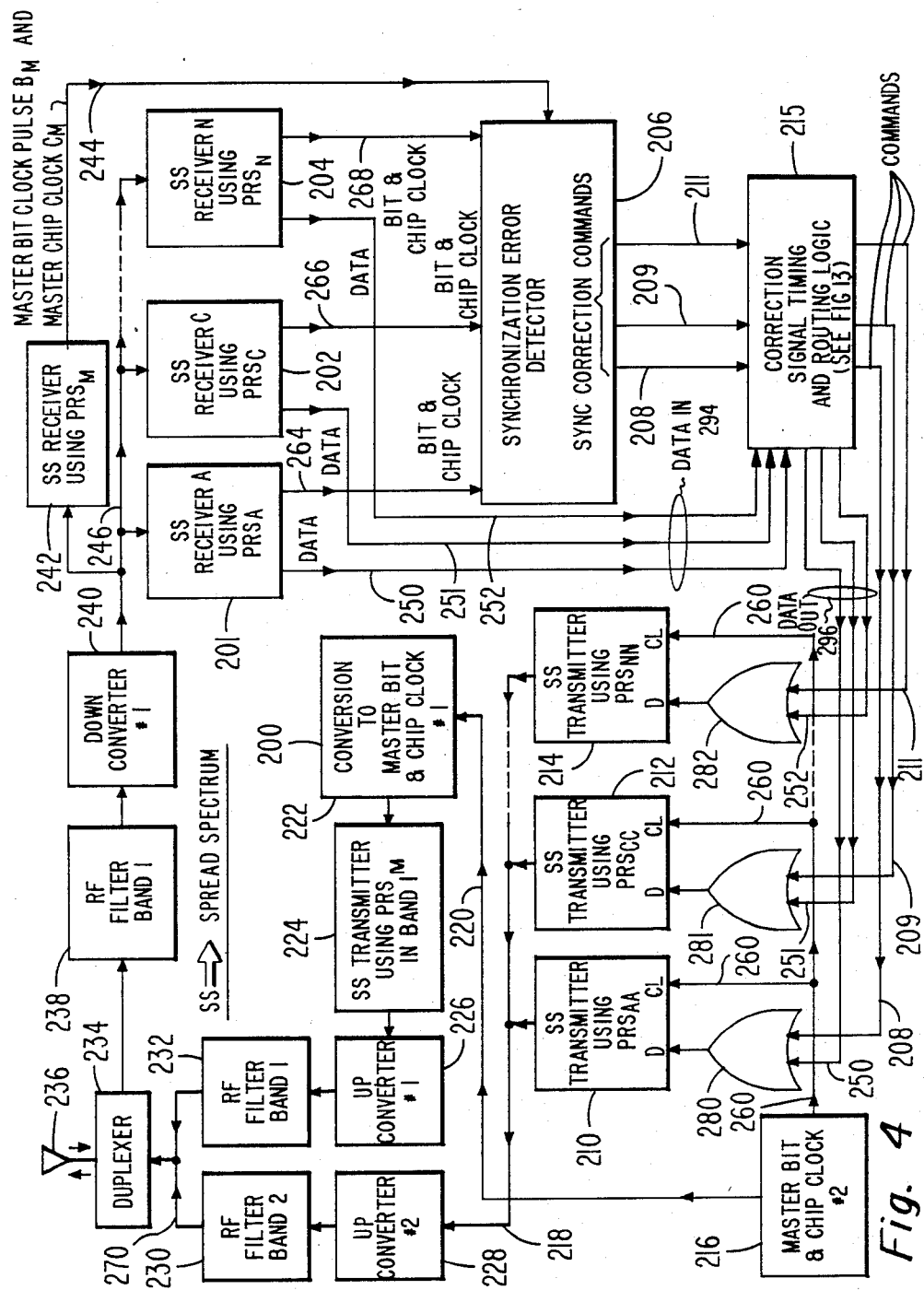
FIG. 4 is a block diagram of the MES of the present invention.

Referring now to FIG. 4, there is shown a block diagram of MES 168 of FIG. 3. MES 168 includes a receiver designed to receive and detect the PRS signal generated by each of the SESs. More specifically, the receivers 201, 202, up to 204, (i.e., N receivers corresponding to the number of SESs in FIG. 3) each receive and detect the PRS signal of the SESs 160, 162, up to 166 of FIG. 3. The MES of FIG. 4 also includes another receiver 242 which is employed to detect the first hop master PRS signal PRS$_M$ originating at the MES of FIG. 4 by transmitter 224 and reflected back from the satellite, as will be discussed later.

All of the signals received by the MES of FIG. 4 are retransmitted from the space satellite 170 and are received via antenna 236 and duplexer 234 and then supplied to RF filter 238, down-converter 240, and then to the receivers such as 201, 202, 204, and 242 via common bus 246, as mentioned above.

Each of these received PRS signals are examined for the data they contain and also for the bit and chip clock signals. The data is supplied from the receivers such as 201, 202, and 204 through ECC signal timing and routing logic 215 and then through OR gates such as 280, 281, and 282, respectively, to the data inputs D of transmitters 210, 212, and 214, respectively, via buses 250, 251, and 252, respectively. Such data is then encoded and modulated in transmitters 210, 212, and 214, and supplied via common output bus 218 to up-converter 228 in a second frequency bandwidth designated herein as bandwidth #2.

The output signal of up-converters 228 is supplied to RF filter 230 and then, (after being combined with the PRS$_M$ output of RF filter 232) is supplied via lead 270, through duplexer 234 to antenna 236 where it is transmitted to the satellite.

It is to be specifically noted that the outputs of the three transmitters 210, 212 and 214 are combined on a common bus 218 so that the transmitted signal is, in fact, the arithmetic addition of the outputs of all of the transmitters 210, 212 and 214 and is represented by the signal PRS$_{C2}$ of FIG. 3.

The master bit and chip clock source 216 supplies clock pulses to the transmitters 210, 212, and 214 via lead 260 for the second hop from the MES.

Also supplied to duplexer 234 is the PRS$_M$ signal which is generated by logic including the master bit and chip clock source 216, conversion logic 200, transmitter 224, up-converter 226, and RF filter 232. More specifically, the master bit and chip clock 216 output is supplied to Conversion to Master Bit and Chip logic block 200 where it is converted to the bit and chip clock rate employed in the first hop. The transmitter 224 responds to the master bit and chip clock output from logic 200 to generate the master PRS signal PRS$_M$ signal in the bandwidth of the first hop and supplies such signal to up-converter 226. The output of up-converter 226 is supplied through RF filter 232 to duplexer 234 and then to antenna 236 from whence it is transmitted to satellite 170 of FIG. 3. Such signal is then retransmitted from satellite 170 back to the large MES of FIG. 4 where it passes through duplexer 234, RF filter 238, down-converter 240 and into receiver 242 which derives the master bit and chip clock pulses therefrom. Such master bit and chip clock pulses are supplied via lead 244 to an input of synchronization error detector logic 206, along with the bit and chip clock signals from receivers 201, 202 and 204.

The synchronization error detector (SED) 206 functions to compare the bit and chip clock pulses from each of the receivers 201, 202, and 204 with the bit and chip clock pulses (B$_M$ and C$_M$) supplied from receiver 242 which, as will be recalled, are the bit and chip clock pulses of the master PRS signal PRS$_M$.

As a result of each of such comparisons of bit and chip clock pulses, there appears at output leads 208, 209, and 211 of SED 206 EDD signals which indicate the phase ECC signal needed for each of the SESs, such as SESs 160, 162, 164 and 166 of FIG. 3. Such ECC signals, in the example being discussed herein, can be 100 bits in length and are supplied through OR gates 280, 281, and 282, to the command input C of each of the transmitters 210, 212 and 214 via buses 208, 209, and 260 respectively.

Figure 5:
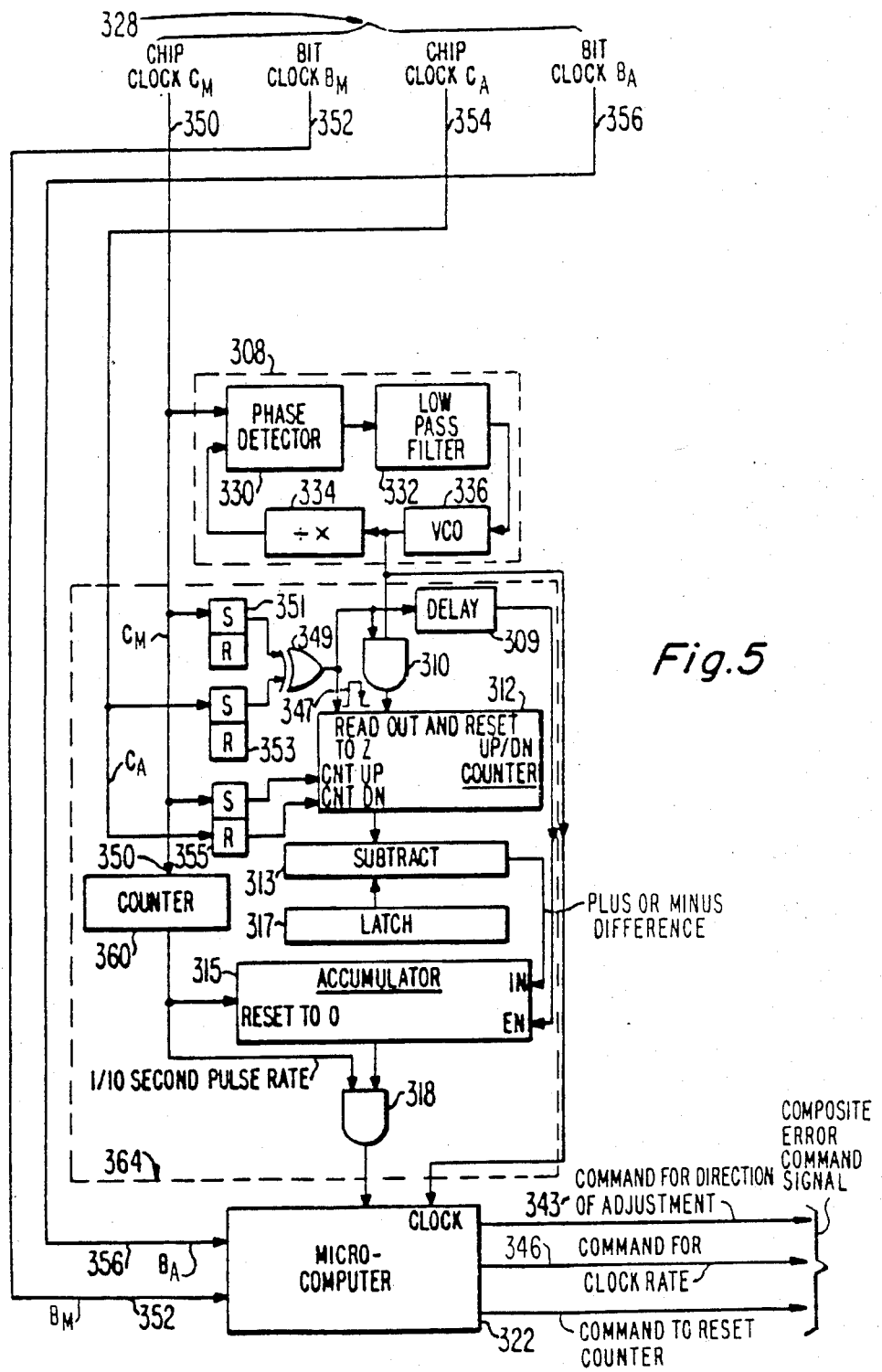
FIG. 5 is an expanded block and logic diagram of a portion of the MES of FIG. 4.

Reference is now made generally to FIG. 5 which shows the logic required to compare the bit and chip clock pulses derived from one of the receivers 201, 202, or 204 of FIG. 4 with the master bit and chip clock pulses derived by receiver 242 of FIG. 4. It is to be understood that one set of logic, as shown in FIG. 5, is required for each of the received signals from each of the SESs. Thus, if there are N SESs, then there must be N logic arrangements as shown in FIG. 5, all of which are included within the SED 206 of FIG. 4. The commands appearing on each of the leads 208, 209, and 211 of FIG. 4 comprise a command for the direction of phase adjustment, as shown on the output lead 343 of the microcomputer 322 of FIG. 5, and also a command for controlling the speed of counting of a variable rate counter located at the SES receiver.

The output of this variable rate counter determines the rate at which the synchronization correction is to take place. A further command resets the variable counter for reasons to be discussed later herein.

Assume that the logic of FIG. 5 is that logic employed to compare the bit and chip clock pulse rates of the PRS$_A$ received by the SES receiver 201 of FIG. 4 with the master bit and chip clock pulse rates (B$_M$ and C$_M$) derived from the master PRS signal receiver 242 of FIG. 4. In FIG. 5, the four inputs 328 correspond to the bit and chip clock pulses appearing at the output of the receivers 201 and 242 of FIG. 4. A detailed description of the operation of FIG. 5 will be given later herein. Only its general purpose will be discussed at this point. As discussed above, the purpose of the logic of FIG. 5 is to compute the phase error of the PRS signal of a given SES (SES 160 of FIG. 3) which PRS signal will be received and detected by receiver 201 of FIG. 4. The SES 160 of FIG. 3 is shown in more detail in FIG. 6.

Figure 6:
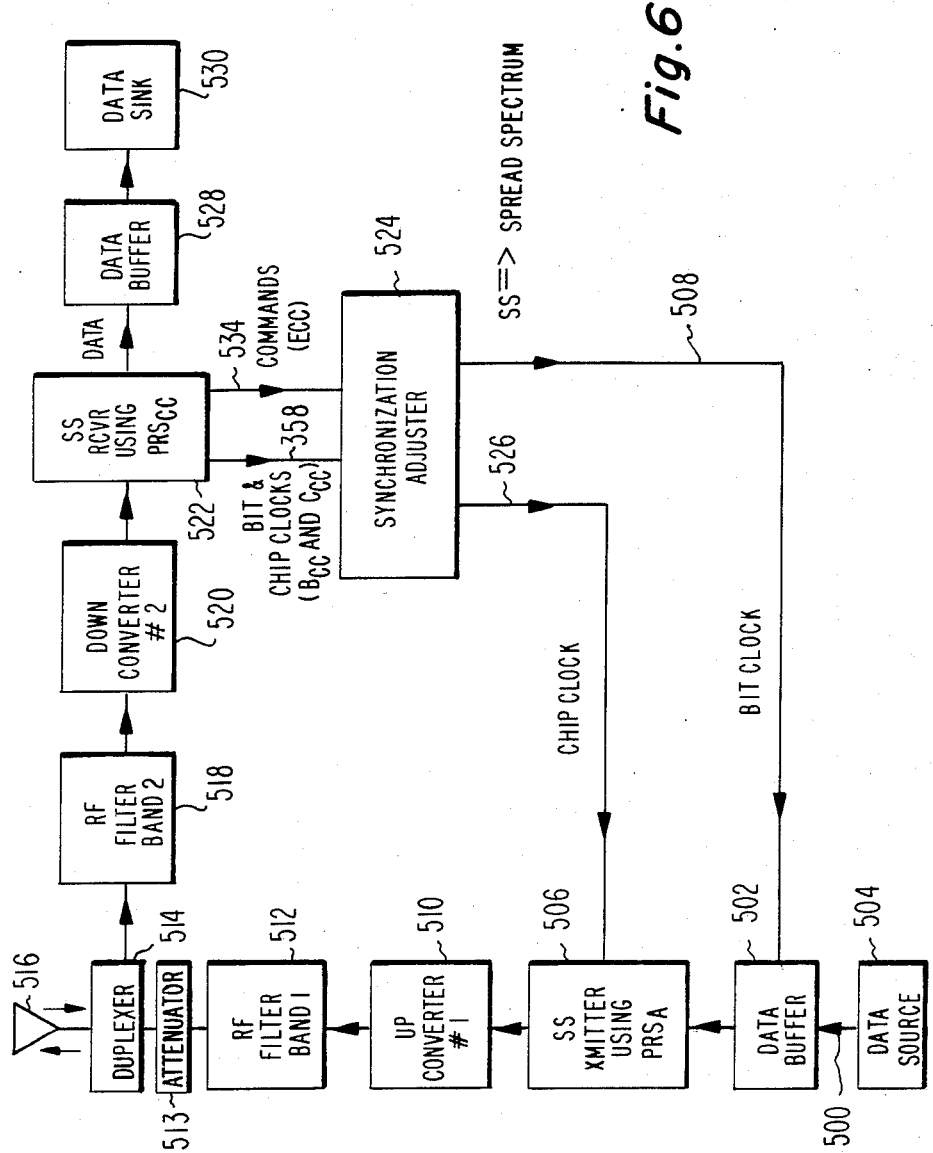
FIG. 6 is a block diagram of a small ground station of the present invention.
Figure 7:
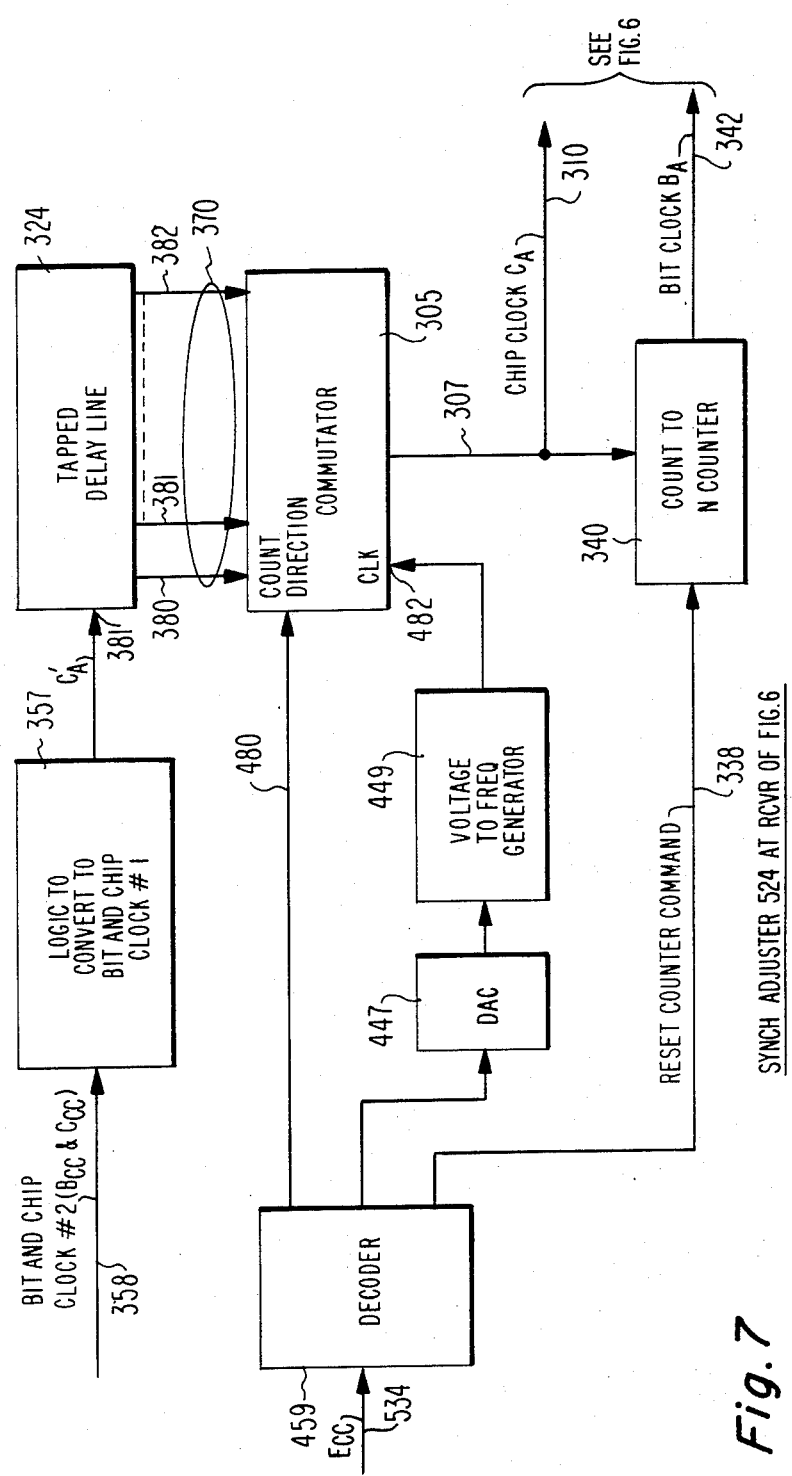
FIG. 7 is a more detailed block diagram of a portion of the SES of FIG. 6.

A command signal is generated in microcomputer 322 (FIG. 5) which will be received by the logic of FIG. 6 and processed by the synchronization adjuster logic 524 of FIG. 6, shown in more detail in FIG. 7, to effect a change in the phase of the PRS signal PRS$_A$ of the SES of FIG. 6. Also, as discussed above, this ECC signal will be sent to the SES 160 of FIG. 6 during the pause period of the second hop transmission from the only other SES with which it communicates, e.g., SES 164 of FIG. 3. Thus, logic must be provided at the MES to store the computed ECC signal required to be transmitted back to SES 160 and further logic must be provided to insert this stored ECC signal in the pause period of the second hop PRS$_{CC}$ transmission from SES 164 (by the MES of FIG. 4) so that it will be transmitted back to SES 160 and then decoded by the synchronization adjuster logic 324 of FIG. 6.

Figure 13:
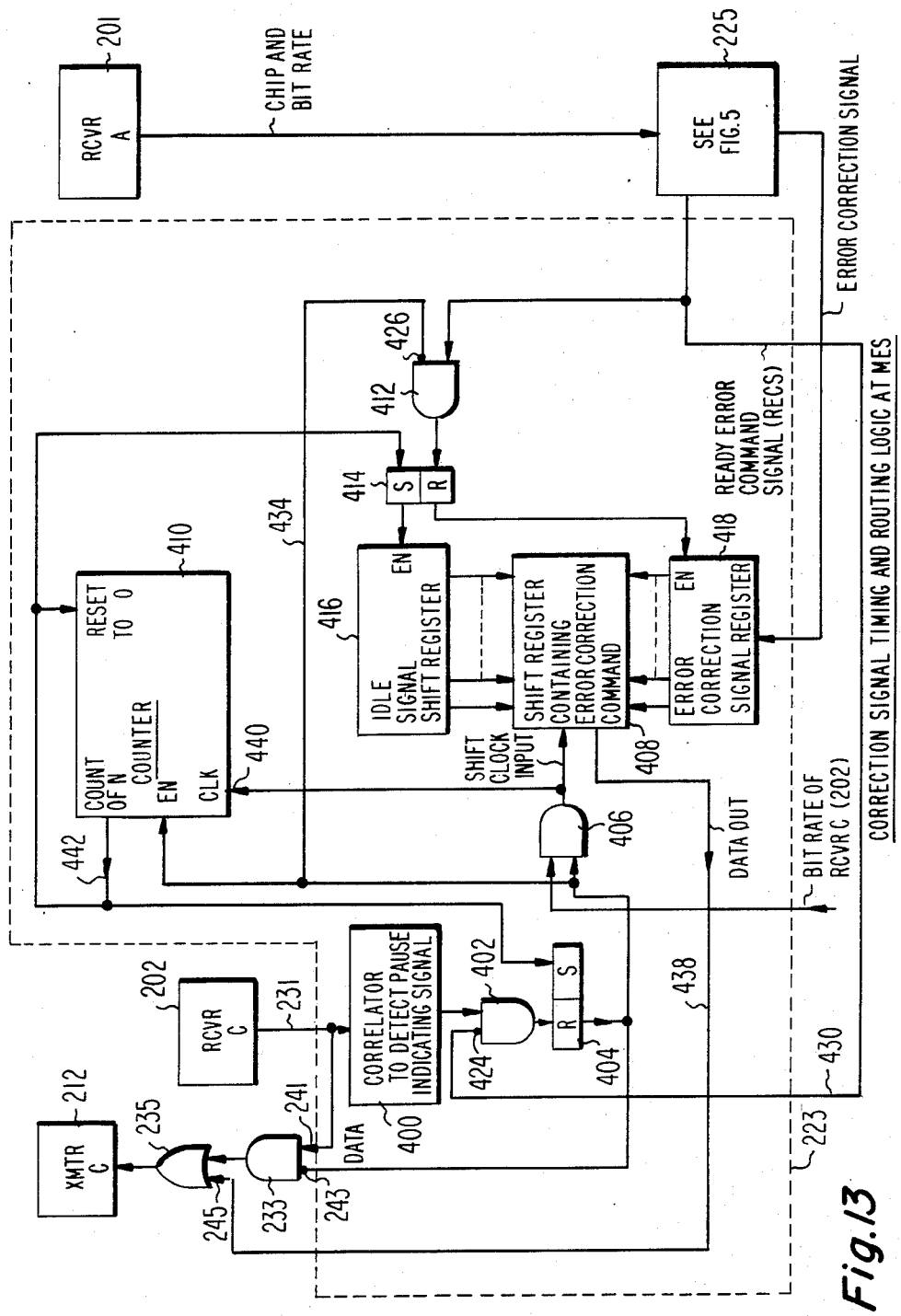
FIG. 13 is a detailed combination block and logic diagram of a portion of FIG. 4.

The logic for storing the computer ECC for a given SES and for transmitting it back to SES 160 during the pause period of the second hop transmission PRS signal PRS$_{CC}$ originating at SES 164 is shown in FIG. 13. The manner in which this logic fits into the overall logic of the system is shown in FIG. 14.

Figure 14:
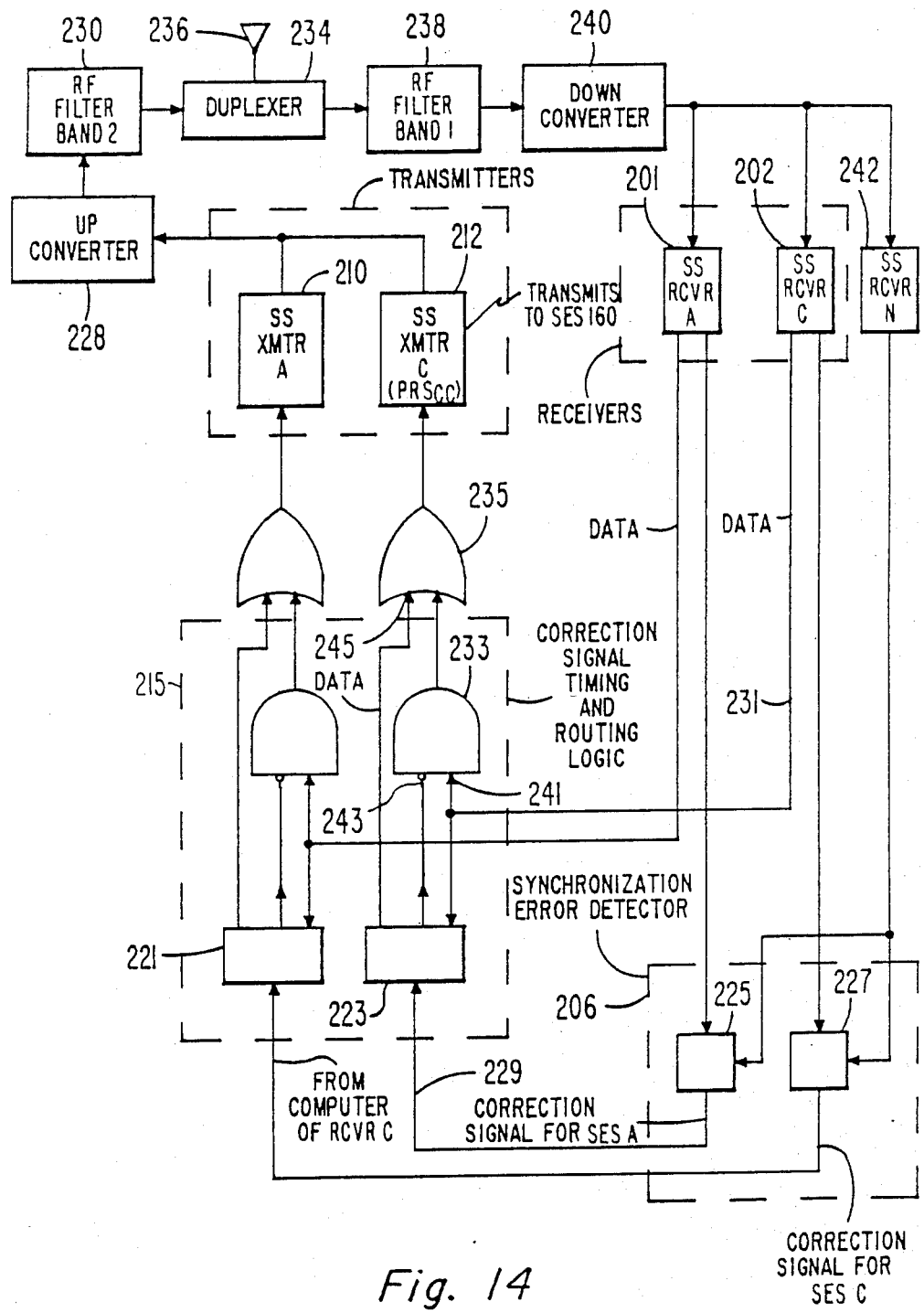
FIG. 14 is a combination block and logic diagram broadly showing the arrangement of the MES.

Consider the MES of FIG. 14 first which is similar to FIG. 4 and with corresponding elements thereof being identified by the same reference characters. The principal differences of FIG. 14 vis-a-vis FIG. 4 is that only two receivers, 201 and 202, are shown, along with the master receiver 242 and only two transmitters 210 and 212 are shown rather than three transmitters. Within the large dashed block 215, which contains the correction signal timing and routing logic, are shown two smaller logic blocks 221 and 223 which are unique to each of the transmitters 210 and 212, respectively.

Within the large synchronization error detector block 206 there are shown two smaller logic blocks 225 and 227 which are associated respectively with receivers 201 and 202.

As will be discussed in more detail later, the error signal generated in logic block 225 (from receiver 201) is supplied via lead 229 to logic block 223 where it is incorporated in the data stream received by receiver 202 and which will be retransmitted by transmitter 212. It can be seen that the data on output lead 231 of receiver 202 is supplied to the input 241 of AND gate 233 and then through OR gate 235 to the input of transmitter 212. The output of transmitter 212 is transmitted to the receiver 201 (FIG. 4) of SES 160.

It is evident that the correction signal and timing routing logic 223 (FIG. 14) must function to insert the ECC signal generated in logic 225 into the pause period of the retransmission (PRS$_{CC}$) from the MES of the signal received by receiver 202 (FIG. 4) from SES 164 (FIG. 3).

As mentioned above, the data stream received from receiver 202 is supplied directly to input 241 of AND gate 233. Such data stream is inhibited during the pause period by a signal generated by logic 223 (shown in detail in FIG. 13) and supplied to the inhibit input 243 of AND gate 233. The ECC signal is supplied to input 245 of OR gate 235 during the pause period of the second hop transmission to SES 160 from SES 164 via the satellite and the MES of FIG. 14. Thus, the output of OR gate 235 is the transmission from SES 164 to SES 160 and includes in the second hop pause period thereof the ECC signal required to correct the phase of the PRS$_A$ transmissions from SES 160.

Referring now to FIG. 13, there is shown a more detailed logic diagram of the contents of the logic 223 of FIG. 14. In addition to such more detailed logic, FIG. 13 shows other logic elements which correspond to logic elements of FIG. 14 and are identified by the same reference character. Such corresponding logic elements include transmitter 212, OR gate 235, AND gate 233, receiver 202, receiver 201, and error detection logic 225.

Every pause period contains, in addition to the ECC signal, an N bit code identifying the period as a pause period. In addition to this N bit code, the remainder of the pause period will contain either an idle signal when no correction signal is required, or it will contain an ECC signal. The ECC signal will consist of a first portion which identifies the direction of phase correction required and the rate of speed at which such phase correction is to be accomplished. Each receiver has logic which will respond to the ECC signal to change the phase of the PRS signal generator therein in a direction and by an amount in accordance with the received ECC signal.

The correlator 400 in FIG. 13 responds to that portion of the code in the pause period which identifies the pause period to thereby produce an output pulse which is supplied to an input of AND gate 402. The inhibit input 424 of AND gate 402 is normally at a high level in the absence of a ready error command signal (RECS) so that flip-flop 404 will be reset by the output of correlator 400. Resetting of flip-flop 404 primes AND gate 406 to permit bit rate pulses derived by and supplied from receiver 202 to pass therethrough and to the parallel-in serial-out shift register 408. The contents of shift register 408, whether it be an idle signal supplied from shift register 416 or an ECC signal, is supplied to the input 245 of OR gate 235 and then to transmitter 212 from whence it is subsequently transmitted to the satellite and then to the SES 160 (FIG. 3).

The contents of shift register 408 is determined in accordance with whether the necessity for an ECC signal has been noted by logic 225 in the MES and a proper ECC signal generated to correct a phase error in the transmissions from SES 160 of FIG. 3.

Assume that the logic 225, which corresponds to the synchronization error detector logic 206 of FIG. 4, has determined that there is a phase error in the PRS$_A$ signals received from SES 160 with respect to PRS$_M$ of the master signal and has generated an ECC signal at the output of the computer 322 of FIG. 5. This ECC signal is supplied to the correction signal register 418 of FIG. 13. Upon the generation of a RECS generated within logic 225 and supplied to an input of AND gate 412, flip-flop 414 is reset to enable the ECC signal register 418 to store the RECS signal supplied from logic 225.

It will be noted that the inhibit input 426 of AND gate 412 is normally, in the absence of a pause indicating signal generated by correlator 400, at a high level so that AND gate 412 will conduct the RECS signal to reset flip-flop 414 and enable ECC signal register 418 so that the contents thereof will be supplied to shift register 408.

The RECS signal, which lasts for the duration of the ECC signal, is also supplied, via lead 430, to inhibit input 424 of AND gate 402. Thus, during the time that the ECC signal is being entered into shift register 408, the occurrence of a pause period in the transmission to receiver 202 from SES 164 will not produce a signal at the output of correlator 400 of AND gate 402. Thus, shift register 408 will be disabled during the pause period and will not receive any shift clock input pulses from the output of AND gate 406, thereby avoiding a conflict with the entry of the contents of the ECC signal register 418 into shift register 408.

The system must then wait until the next pause period in the transmission from SES 164 in order to shift the ECC signal out of shift register 408 and into the stream of data bits outputted from receiver 202 during the pause period thereof.

Similarly, it is required that after the beginning and during the pause period of the transmission from SES 164 an entry of the contents of ECC signal register 418 into shift register 408 must be prevented. The foregoing is accomplished by the reset output of flip-flop 404 being supplied to the inhibit input 426 of AND gate 412 via lead 434.

Thus, if correlator 400 produces an output before the RECS signal occurs, the then existing contents of shift register 408 will be shifted serially therefrom via lead 438 and to input 245 of OR gate 235. No other change in the contents of shift register 408 will occur during such shifting out of the contents of shift register 408.

When flip-flop 404 is reset by a correlation pulse from correlator 400, counter 410 is enabled and will count from a reset to zero position to a count of N under control of a clock pulse signal which corresponds to the bit clock pulses supplied from receiver 202 to clock input 440 from the output of AND gate 406. At the count of N, a pulse is supplied from counter 410 via lead 442 to perform several functions. One such function is to set flip-flop 404 and thereby disable AND gate 406. The disabling of AND gate 406 in turn terminates the serial shifting out of the contents of shift register 408 which is, in fact, the N bit ECC signal. The count of N also resets counter 410 to zero where it will remain since the clock pulses supplied to clock input 440 have been terminated due to the disabling of AND gate 406.

The count of N output from counter 410 is also supplied to the set input of flip-flop 414 to set flip-flop 414 and thereby enable the idle signal shift register and shift the contents thereof into shift register 408. Thus, until another ECC signal is shifted into shift register 418, the idle signal will be contained in shift register 408 and will be entered into the pause period of the transmission from SES 164 to thereafter be transmitted to SES 160. SES 160 will recognize the idle signal as such and will make no change in the phase of the locally generated PRS signal.

Consider now FIG. 6, which shows a block diagram of the receiver at an SES (assumed to be SES 160 of FIG. 3). Consider first the reception of a ECC signal from the MES of FIG. 13 (or FIG. 4). Such signal is received (containing a train of data bits) by antenna 516 and is supplied through duplexer 514, RF filter 518, down-converter 520, and to local receiver 522. Receiver 522 decodes the signal in the manner described hereinbefore with respect to FIG. 2 to supply data via one output to data buffer 528 and then to data utilization means 530. The bit and chip clock pulses are extracted therefrom, as discussed hereinbefore with respect to FIG. 2, and supplied to synchronization adjuster 524. The ECC signal is also supplied to synchronization adjuster 524 via lead 534 where it is decoded by means of logic, such as shown in FIG. 7 and to be described later herein, which will correct the phase of the received bit and chip clock pulses ($B_{CC}$ and $C_{CC}$) as required by the ECC signal and then output such corrected chip and bit clock pulses on leads 526 and 508 to transmitter 506 and data buffer 502 respectively.

Referring now to FIG. 7 which shows the synchronization adjuster 524 of FIG. 6 in more detail, the bit and chip clock pulses ($B_{CC}$ and $C_{CC}$) received from receiver 522 of FIG. 6 are supplied via lead 358 to logic arrangement 357 which converts such received bit and chip clock pulses to the bit and chip clock pulse rate employed in the first hop from the SES to the satellite. Such converted bit and chip pulses do not, at this time, incorporate the needed phase changes. Such converted bit and chip clock pulses are then supplied to tapped delay line 324 whose output cooperates with the action of commutator 305 to produce a phase shifted chip clock pulse output on output lead 307.

A decoder 459 responds to the received ECC signal to supply a phase correction direction-indicating bit to commutator 305 via lead 480. The direction in which the commutator 305 commutates the taps 370 of tapped delay line 324 determines the direction of phase correction.

Decoder 459 also responds to a portion of the supplied ECC signal to supply to digital-to-analog converter (DAC) 447 a digital value indicating the desired rate of speed of phase correction. A voltage-to-frequency generator 449 responds to the analog output of DAC 447 to supply the clock signal to clock input 482 of commutator 305 which controls the rate of speed of commutation, as discussed above.

Counter 340 responds to another portion of the received ECC signal to become reset to zero and thereby synchronize the bit clock pulses of the received signal. That portion of the ECC signal which resets counter 340 to zero at the proper time is derived generally from the bit clock inputs 352 and 356 of FIG. 5 after being processed by microcomputer 322 (FIG. 5), as will be discussed later herein.

The chip clock and bit clock pulse train appearing on leads 310 and 342 of FIG. 7 are supplied respectively to transmitter 506 and data buffer 502 of FIG. 6.

Figure 15:
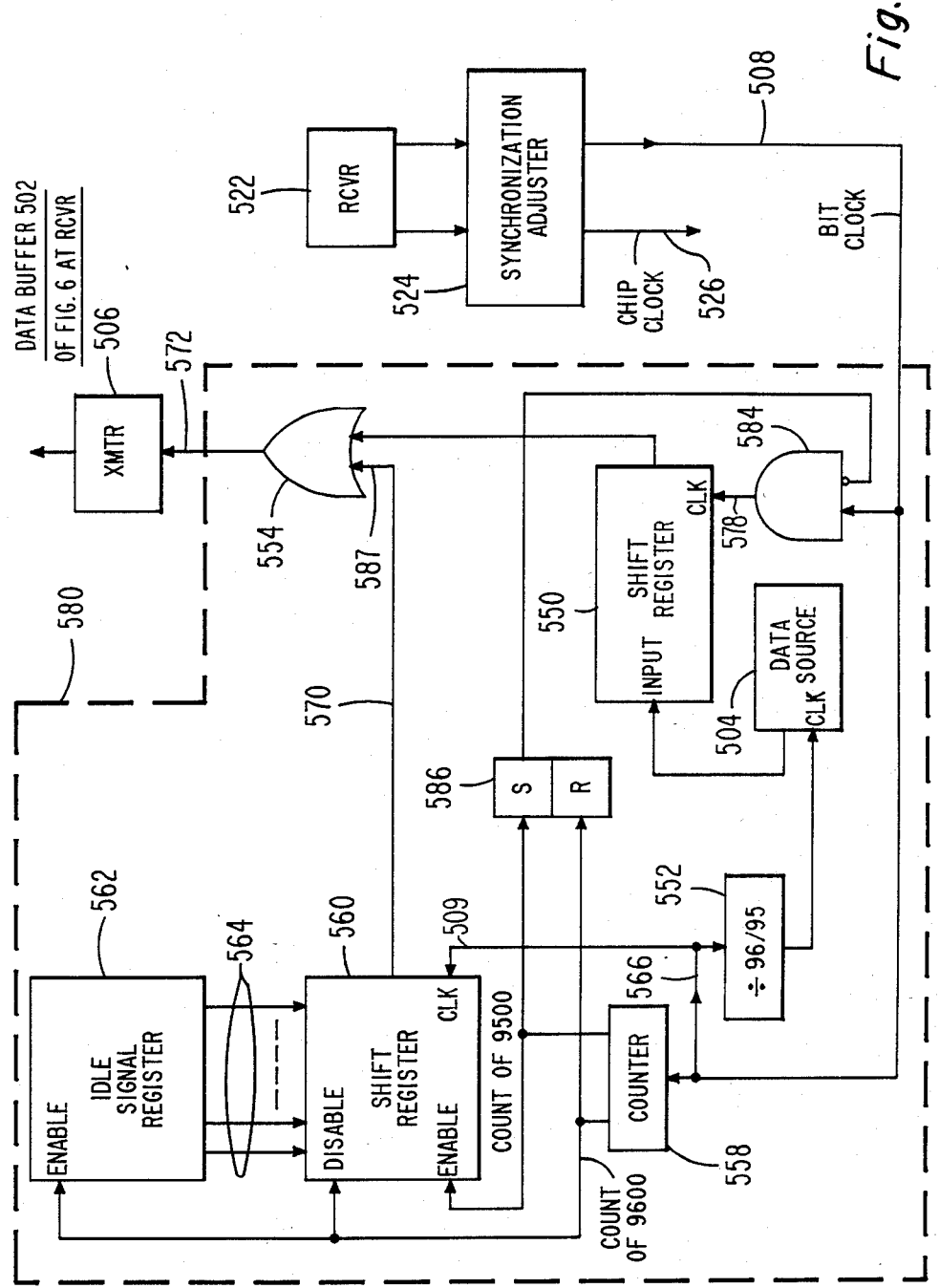
FIG. 15 is a combination block and logic diagram of that portion of the SESs employed to load data bits into the stream of data bits to be transmitted.

Referring now to FIG. 15 there is shown within dashed block 580 a more detailed diagram of the data buffer logic 502 of FIG. 6. Also shown in FIG. 15 is a transmitter 506, a receiver 522 and a synchronization adjuster 524 which correspond to similarly identified logic elements identified in FIG. 6.

In FIG. 15 the bit clock signal is supplied from synchronization adjuster 524 to counter 558, to a divide-by-96/95 divider 552 via lead 566, and also to an input of AND gate 584. This bit clock rate is nominally 9600 bits per second so that the output of the divide unit 552 is 9500 clock pulses per second. Thus, the data is stepped out of data source 504 and into shift register 550 at a 9500 bit per second rate. Data is then shifted out of the shift register 550 at a rate of 9600 bits per second by virtue of the clock pulses supplied from sync adjuster 524 to clock input 578 thereof through AND gate 584, when enabled. AND gate 584 is enabled when flip-flop 586 is in a RESET condition, which occurs during the count of 0 to 9500 of counter 558. Flip-flop 586 becomes set at the count of 9500 of counter 558. When the count of 9600 is reached by counter 558, flip-flop 586 is reset again, thus enabling the AND gate 584 until the following count of 9500 is reached. Accordingly, shift register 550 will not clock out bits therefrom between the counts of 9500 and 9600 of counter 558, which is defined herein as the pause period of the bit stream generated by the SES represented generally in FIG. 15. During this pause period, the contents of shift register 560 are shifted therefrom to input 587 of OR gate 554 and then to the input of transmitter 506.

It will be noted that when shift register 560 is enabled between the counts of 9500 and 9600 of counter 558 the bit clock signal supplied via leads 508 and 509 from synchronization adjuster 524 will shift out the contents of shift register 560. The contents of shift register 560 consists of the identification code of the source SES and the idle signal which fills the pause period and is contained permanently in register 562. At the end of the shifting out of this idle signal from register 560, which occurs at the count of 9600 of counter 550, the idle signal register 562 is enabled to again enter the identification code and idle signal into shift register 560 in preparation for the generation of said identification and idle signal during the next pause period of the bit stream generated by the SES of FIG. 15.

Consider now the detailed logic of FIG. 5 and FIG. 7 together. The logic of FIG. 5 determines the phase angle error of the PRS signal of each SES with the $PRS_M$ signal generated by the MES but after transmission thereto, and being received back from, the satellite. As stated above, the logic of FIG. 5 is located at the MES with duplicate logic arrangements as shown in FIG. 5 being employed for each of the SESs in the system.

In FIG. 5, the four inputs 328 correspond generally to bit and chip clock pulses appearing at the output of receivers 201 and 242 of the MES of FIG. 4. The specific purpose of FIG. 5 is as follows. The phase difference ($\Delta\phi$) between chip clock pulses $C_M$ (from the MES) and $C_A$ (from SES 160 of FIG. 3) is measured and a clock, in the form of counter 312, caused to run during the period between the occurrence of chip clock pulse $C_A$ and a subsequent chip clock pulse $C_M$, assuming chip clock pulse $C_A$ to be lagging chip clock pulse $C_M$. If $C_A$ is leading chip clock pulse $C_M$ then counter 312 is again caused to run but now to determine the amount of leading phase rather than lagging phase, as will be discussed in more detail later.

The count value in counter 312 in the MES is accumulated over a period of time as, for example 0.1 second, and then supplied to computer 322 through subtract logic 313 and accumulator 315. Computer 322 functions to interpret the total accumulated count value in counter 312 and then generate an ECC signal which is sent from the MES to the SES. This ECC signal contains a component which will cause a third clock pulse train of variable frequency to be supplied to clock input 482 of commutator 305 (FIG. 7) in the SES which responds thereto to successively connect (commutate) the tapped outputs 370 of tapped delay line 324 (FIG. 7) to an output lead 307. The input to tapped delay line 324 is the non-phase corrected chip clock timing pulses $C'_A$ supplied thereto via lead 358 and conversion unit 357.

The tapped delay line 324 of FIG. 7 can be formed of a number of turns of coaxial cable with each turn having a tap thereon such as output taps 380, 381, and 382. The commutator 305 responds to a clock supplied to input lead 482, to commutate the connection of output taps 380–382 to output terminal 307 of commutator 305 in a continuous and cyclical manner.

It is well known that by successively and cyclically connecting the tapped output of a tapped delay line 324 to single output lead 307 a continuous phase shift is introduced into chip clock pulses $C'_A$. A continuous phase shift is defined as a change in frequency. Thus, by changing the clock pulse rate supplied to the clock input 482 of commutator 305 the frequency rate of chip clock signal $C'_A$ is changed to a corrected rate $C_A$. Such change in frequency is continued until chip clock signal $C_A$ (derived from $C_{CC}$) is, in fact, phase synchronized with chip clock $C_M$ at the MES of FIG. 4. Perfect synchronization will occur when the count value accumulated in accumulator 315 reaches 0, a realistically unobtainable condition.

More specifically, the chip clock pulses $C'_A$ are supplied to the input 381 of tapped delay line 324. Thus, by successively connecting output taps 380–382 to the output lead 307 of commutator 305, the chip clock $C'_A$ input is, in effect, phase shifted each time a successive tap output is connected to output terminal 307 of commutator 305. Since, as stated above, a continuous phase shift of a signal is equivalent to a frequency change, the frequency of chip clock signal $C'_A$ is thereby altered. The signal appearing on output terminal 307 of commutator 305 is now chip clock signal $C_A$. It is supplied to transmitter 506 of FIG. 6, and is related to the phase of chip clock $C_M$ in that when it (chip clock $C_A$) is transmitted to and received back from the satellite by the MES of FIG. 4, it is synchronized with the received MES chip clock $C_M$.

At this time the count value accumulated in accumulator 315 (FIG. 5) will then theoretically become 0 and the rate of the clock pulse supplied to commutator 305 (FIG. 7) will become 0. However, due to many factors, theoretical phase synchronization is not likely to occur and a certain amount of hunting for phase synchronization will always be present, as indicated by the time vs. phase difference curve of FIG. 10. It should be noted that commutator 305 of FIG. 7 can commutate at a very slow rate down to 0 and extending up to a very high rate where the frequency of the chip clock signal $C_A$ can be changed by many clock pulses per second so that the phase adjustment between $C_M$ and $C_A$ can be very fast, but with great sensitivity.

The chip clock $C_M$ is generated by transmitter 224 of the MES of FIG. 4, transmitted to the satellite and then transmitted back to the MES of FIG. 4, via satellite, where it is supplied to the input of phase detector 330 (FIG. 5), the set input of flip-flop 351, and to clock input 350 of counter 360.

Phase detector 330 of FIG. 5 is part of a phase locked loop (PLL) 308 circuit which also includes low pass filter 332, VCO 336 and frequency divide-by-X logic 334. The purpose of PLL 308 is to generate a high frequency output from VCO 336 which is supplied via AND gate 310 to counter 312. The frequency of the output of VCO 336 is determined by the value of X in the divide by X circuit 334 and can be, for example, 100. Thus the output frequency of VCO 336 is 100 times the chip pulse $C_M$ rate.

The purpose of the logic within dashed line block 364 is to generate a digital value which can be either positive or negative (i.e., plus or minus) and which is supplied to microprocessor 322 through AND gate 318. This digital value, which is a count value generated in counter 312 and accumulated in accumulator 315, is interpreted by microprocessor 322 which will respond thereto to produce a command for clock rate adjustment on its output lead 346 which is one component of the total composite ECC signal, and which is sent from the MES to the clock input 482 of commutator 305 (FIG. 7) to cause output taps 380, 381, and 382 of tapped delay line 324 (FIG. 7) to be connected to output terminal 307 of commutator 305 at a given rate and in a given direction as discussed above.

The operation of the logic within the block 364 of FIG. 5 will now be discussed in more detail with the aid of the timing waveforms of FIGS. 8 and 9. For purposes of brevity, the timing waveforms of FIGS. 8 and 9 will be referred to herein as waveform 8B or waveform 9A rather than as waveform A of FIG. 8 or waveform A of FIG. 9.

The pulse trains $C_M$ and $C_A$ are connected respectively to the set inputs of flip-flops 351 and 353 and also connected respectively to the set and reset inputs of flip-flop 355. The outputs of flip-flops 351 and 353 are shown in waveforms 8B and 8D when $C_M$ leads $C_A$ in phase, as shown in waveforms 8A and 8C. The output of XOR gate 349 is shown in waveform 8E and consists of a high level signal when the input signals are unequal and a low level signal when the inputs are equal, in accordance with the characteristics of an XOR gate.

The aforementioned positive pulses, represented by a single pulse 347 in FIG. 5, is supplied to one input of AND gate 310 to enable AND 310 and to allow pulses from VCO 336 to pass therethrough and to up/down counter 312 for the duration of pulse 347. It is evident that the number of pulses supplied to counter 312 depends on the width of pulse 347 which in turn depends upon the phase difference $\Delta\phi$ between $C_M$ and $C_A$.

The supplying of such train of pulses to counter 312 is not, however, by itself sufficient. A polarity sign must also be supplied to counter 312 in accordance with whether $C_M$ is leading or lagging $C_A$ so that counter 312 will count respectively up or down. Such polarity is determined by the output of flip-flop 355. If $C_M$ leads $C_A$, as is the case shown in the waveforms of FIG. 8, then the set output of flip-flop 355 will be high during the period of the high level outputs from XOR gate 349, as shown in waveforms of 8E and 8F. Since the set output of flip-flop 355 is supplied to the count-up input terminal of counter 312 the counter 312 will count up during the high level output pulses from XOR gate 349.

The counter 312 is always set or reset to a predetermined value Z at the trailing edge of the output pulses from XOR gate 349 so that the next subsequent count value supplied to counter 312 will cause counter 324 to begin counting from the value of Z, either up or down. The latch 317 also contains a value Z which is always subtracted from the final count value of counter 312 by subtract logic 313. Thus, the output of subtract logic 313 is the difference between Z and the final count contained in counter 312 and will have a polarity sign thereon indicated by the most significant bit (MSB) of the output of subtract logic 313. Such difference count value is accumulated in accumulator 315 for each pair of chip clock pulses $C_M$ and $C_A$.

The operation of the logic when $C_M$ lags $C_A$ is shown in the timing waveforms of FIG. 9. Here again the outputs of flip-flops 351 and 353 are represented by waveforms 9B and 9D with XOR gate 349 responding to conditions of different level output signals from flip-flops 351 and 353 to produce the train of output pulses shown in waveform 9E. However, in the case where $C_M$ lags $C_A$, $C_A$ occurs first so that flip-flop 355 is reset during the output pulses from XOR gate 349, as indicated in waveform 9F. Thus the reset output of flip-flop 355 is high and instructs counter 312 to count down during the time that the output of XOR gate 349 is high. The flip-flop 351 is set by the next occurring $C_M$ clock pulse, terminating the output pulse from XOR gate 349 and also the train of pulses supplied to counter 312 through AND gate 310.

The contents of counter 312 are then read out to subtract logic 313 by the trailing edge of the output pulse 347 from XOR gate 349. Such subtract logic 331 next subtracts the output of counter 312 from the value Z in latch 317 to produce a positive difference which is supplied to accumulator 315. Accumulator 315 is enabled by pulse 347 after being delayed in delay logic 309 to permit the settling down of the logic computing the difference value.

When counter 360 reaches its count capacity, which it does every 0.1 second, AND gate 318 is enabled to transfer the total count value accumulated in accumulator 315 for the prior 0.1 second to microprocessor 322. Microprocessor 322 in MES responds to such total count value and its polarity sign to generate a command for clock rate signal adjustment on output lead 346 and a direction command (polarity sign) on output lead 343. Such commands are sent to the clock input 482 (FIG. 7) and the direction input 480 of commutator 305 in SES, as discussed above relative to FIG. 7, to control the rate and direction of commutation.

The bit clocks $B_M$ and $B_A$ are also supplied to microprocessor 322 via leads 352 and 356, respectively. After phase synchronization has been obtained between $C_M$ and $C_A$ the processor 322 in MES computes the difference in time between the received bit clocks $B_M$ and $B_A$ and then sends a command to the SES of FIG. 7 to alter the timing of bit clock counter 340 of FIG. 7 by that amount of time so that when $B_A$ is transmitted back from the SES of FIG. 7 to the MES of FIG. 4 via the satellite it will be in phase with $B_M$ at the outputs of receivers 201 and 242 of FIG. 4.

The changing of the timing (phase) of $B_A$ is done by resetting counter 340 (FIG. 7) to 0 by a command signal sent from computer 322 in MES which is decoded by decoder 459, and then supplied through lead 338 to counter 340. It is to be noted specifically that $B_A$, as supplied to transmitter 210, is not in phase with $B_A$ as it is returned from the satellite nor is it in phase with $B_M$ appearing at the output of receiver 201 of FIG. 4. $B_A$ must have a phase such that when it returns from the satellite it will be in phase with $B_M$ at the output of receivers 201 and 242 of FIG. 4.

Figure 10:
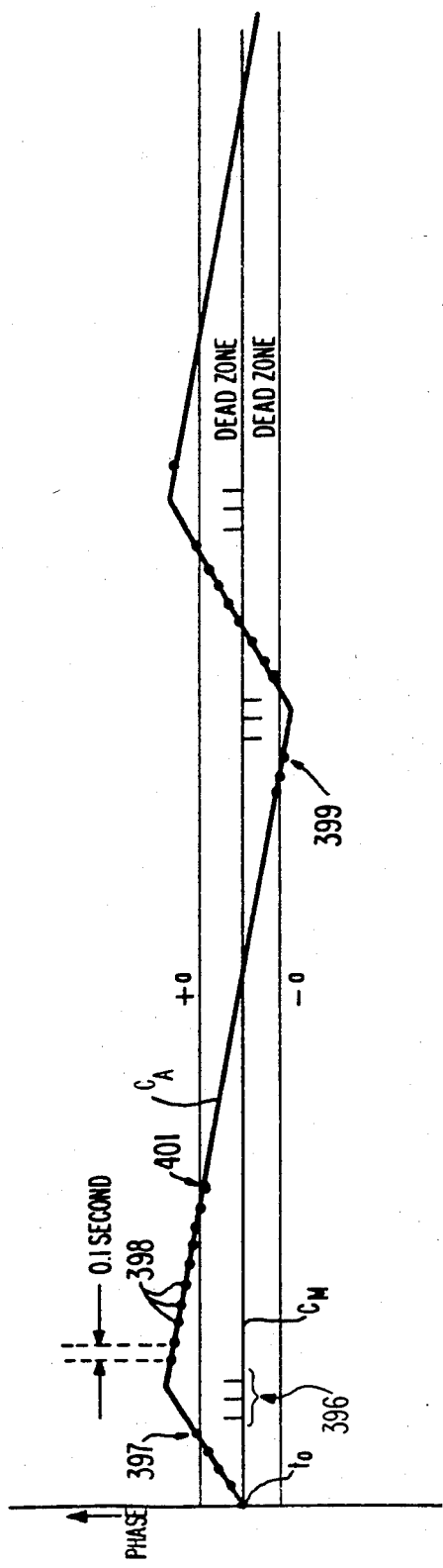
FIG. 10 is a curve showing the chip phase difference vs. time of $C_A$ and $C_M$ shown in the timing diagrams of FIGS. 8 and 9.

Referring now to FIG. 10 there is shown a typical case history of how the phase difference $\Delta\phi$ between $C_M$ and $C_A$ can vary in time. The diagram of FIG. 10 shows phase vs. time where the small intervals marked off by dots such as dots 398 represent time periods of 0.1 second. The system is shown starting with a phase error of 0 at time $t_0$. For the case shown, the chip clock $C_A$, as first received at the MES, is running slightly ahead of chip clock $C_M$.

The function of the tracking mode software, shown in FIG. 11 and to be described later herein, is to keep the phase in the dead zone which is defined herein as being between the two parallel horizontal lines $+a$ and $-a$. The dead zone is that range of phase difference between $C_M$ and $C_A$ at the MES which is acceptable to the system. Every 0.1 second the phase is measured and if it is in the dead zone no action is taken. If not, action is taken.

As soon as the first measurement is taken where the phase is out of the dead zone (in this case slightly higher than $+a$), at point 397 in FIG. 10, the microprocessor 322 (FIG. 5) takes steps in the form of an ECC signal to decrease the frequency of $C_A$ in order to reduce the phase error. The processor will subsequently ignore all phase difference inputs ($\Delta\phi$) from accumulator 315 (FIG. 5) for the next 0.8 seconds (shown by the three vertical tick marks 396 along the horizontal time axis). The foregoing occurs since about 0.5 seconds are required for a phase change ECC signal to be transmitted from the MES to the affected SES via satellite and then the corrected $C_A$ signal to be transmitted back to the MES via the satellite.

Subsequently, 0.8 seconds after the original phase change at the transmitter in the MES, the phase difference is sampled and examined continuously thereafter every 0.1 second (until a new phase change is made). The successive phase differences are measured to ensure that the phase direction is now trending downward back toward the dead zone. As long as the phase is decreasing towards the dead zone no further action is executed by the microprocessor 322 of FIG. 5.

Eventually, however, the decrease in phase of $C_A$ will cause the phase difference to go below $+a$ and into the dead zone. The phase is still continuously monitored thereafter but no action is taken as long it remains in the dead zone.

After a time, the phase error will fall below the line $-a$ as shown at time 399 in FIG. 10. At this time action is again taken by microprocessor 322 (FIG. 5) which realizes that the frequency of $C_A$ must be increased to reduce the phase error back towards 0. Such action is taken but no monitoring of the results occurs during the next 0.8 seconds. Once monitoring of the phase begins again no further action is taken until the phase error exceeds +a. Action of the foregoing type continues indefinitely.

The phase will continue to increase until the frequency $C_A$ is sufficiently decreased at which time the phase will decrease back towards the dead zone. Thus, the phase continually oscillates within or just above or below the dead zone and the resulting phase error remains far less than 180°. The details of the foregoing tracking procedure as controlled by microprocessor 322 is shown in the flow chart of FIG. 11, which will be described below.

It should be noted at this point that the operation of the system has two modes; the acquisition mode in which chip and bit phase synchronism are initially acquired, and the tracking mode in which chip and bit synchronization are maintained. In the following discussion of the flow diagram of FIG. 11 it is assumed that initial phase synchronization of bit and chip phase synchronization has been acquired and that the system is in the tracking mode. Following a discussion of the flow chart of FIG. 11 a discussion of the flow chart of FIG. 12, which describes the acquisition mode, will be set forth.

Figure 11:
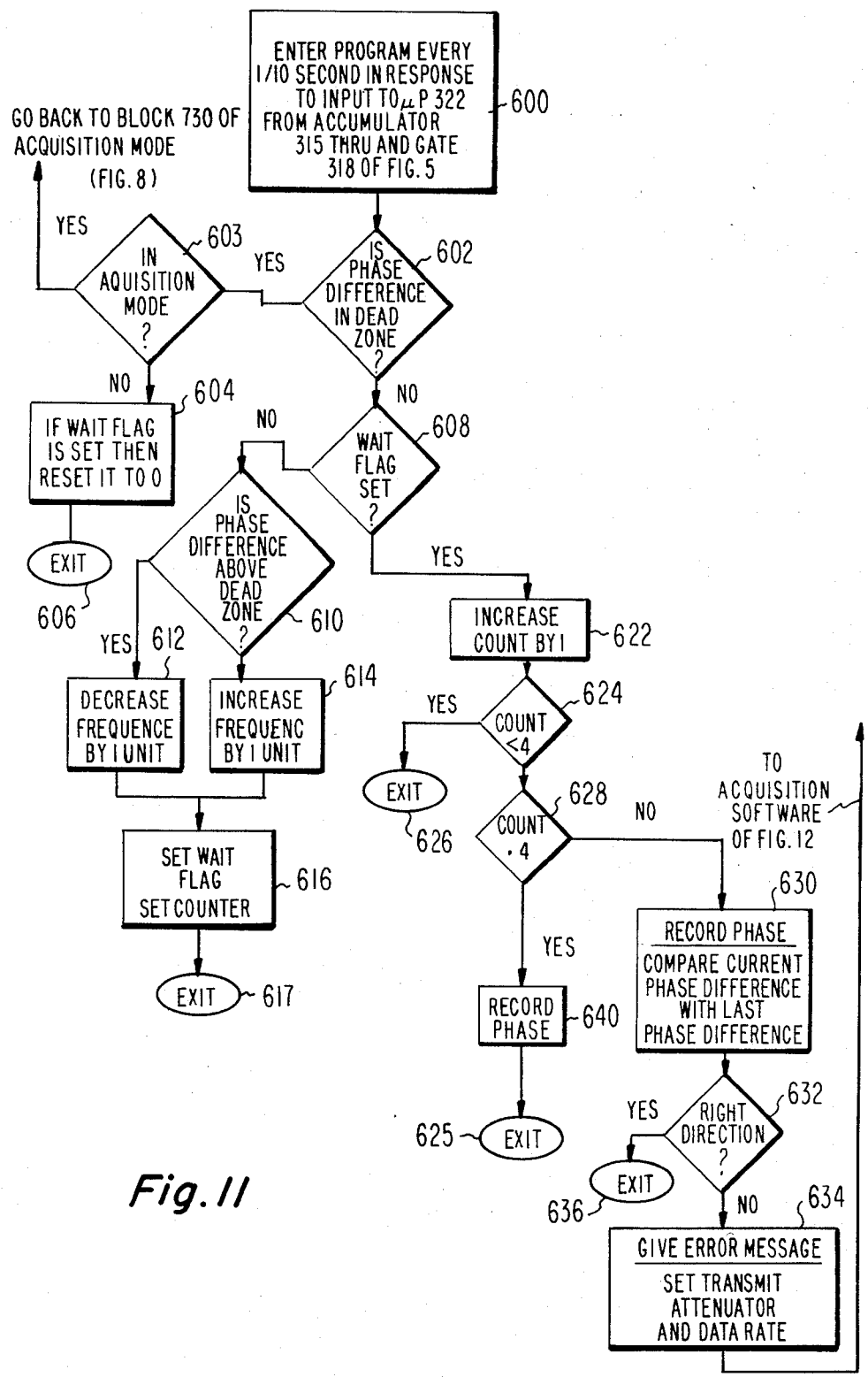
FIG. 11 is a flow chart of the method employed to control the phase differences shown in FIG. 10 during the steady state mode of operation (the track mode)

The operation represented by the flow chart of FIG. 11 is entered into once every 0.1 second in response to the accumulated count which is supplied from accumulator 315 through AND gate 318 every 0.1 second under the control of the output of counter 360, as indicated by step 600 of FIG. 11. A decision is made as to whether the phase difference ($\Delta\phi$) between $C_M$ and $C_A$ is within the dead zone, as determined by the count value supplied from accumulator 315 and as also indicated by decision step 602 of FIG. 11. If in the dead zone, a wait flag, which can be a single bit in a known register or memory location in processor 322, is reset to 0 and the program is exited by exit step 606. The program is then re-entered at step 600 at the end of 0.1 second when another count value is supplied from accumulator 315 to processor 322 of FIG. 5.

Assume now that the phase difference has moved out of the dead zone of FIG. 10 so that the logic moves to decision step 608 which determines if the wait flag is set. If not, then the logic moves to the decision step 610 which determines if the phase is above the dead zone. If it is above the dead zone, then the signal is processed, as indicated in step 612, by decreasing the frequency of $C_A$ by one unit of frequency. One unit of frequency is a predetermined amount of frequency corresponding to an amount larger than the maximum possible frequency shift. In the foregoing example where the chip rate is 10 MHz and the maximum frequency shift is 0.1 Hz before leaving the dead zone of FIG. 10 a unit might correspond to 0.1 Hz or more depending on the particular design.

Next, assume the wait flag is set, as indicated in step 616, and also that the counter 622 is set to 0. The program then exits in step 617. The counter 622 can be another register or another memory location in processor 322 of FIG. 4. Returning now to decision step 610, if the phase is not above the dead zone then it must be below the dead zone because it was determined in step 602 that the phase was not in the dead zone. Step 614 then functions to increase the frequency by one unit, set the wait flag, and also set counter 622 to 0.

One-tenth second later the next count value is supplied to computer 322 (FIG. 5) from accumulator 315 of FIG. 5 and the logic of FIG. 11 steps through steps 602 and 608 to step 622 since the wait flag was set in the prior running of the logic. Step 622, as mentioned above, represents the incrementing of the counter, and its count is increased by an increment of 1. Next, the logic checks the accumulated value in counter 622 and, if it is less than 4, exits via exit step 626. One-tenth second later the program is again re-entered and processes the signal through steps 602, 608, 622, and 624 to exit 626 since the count is now only 2 (less than 4).

Eventually, 0.2 second later, the count in 622 becomes 4 so that decision step 624 directs the logic to decision step 628 which recognizes that counter 622 contains a count of 4 and therefore records the phase difference in step 640, as evidenced by the last count value supplied from accumulator 315 to processor 322 in FIG. 5, and then exits via exit step 625.

One-tenth second later, the logic of FIG. 11 will again be entered via step 600 and the signal processed through steps 602, 608, 622, 624 and into decision step 628. Since the count is now 5 the program will go to step 630 and record the phase difference, i.e., the latest count value accumulation supplied from accumulator 315 (FIG. 5) and also will compare such latest recorded phase difference ($\Delta\phi$) with the phase difference (count value) recorded in the prior execution of the logic by step 640.

The absolute value of the two recorded phase differences must be decreasing in order for the system to be correcting the phase difference in the proper direction. Therefore, if the count value (the last recorded phase difference) of step 630 is less than the phase difference recorded by step 640 then the logic is exited via exit step 636, the program is re-entered 0.1 second later, and the entire process is repeated. However, if the last recorded phase count value (the last recorded phase) is greater than the phase recorded by step 640 the logic indicates that the phase error is growing and that the system is malfunctioning. Accordingly, step 634 is entered and the logic energizes suitable alarm equipment indicating a malfunction.

Figure 12:
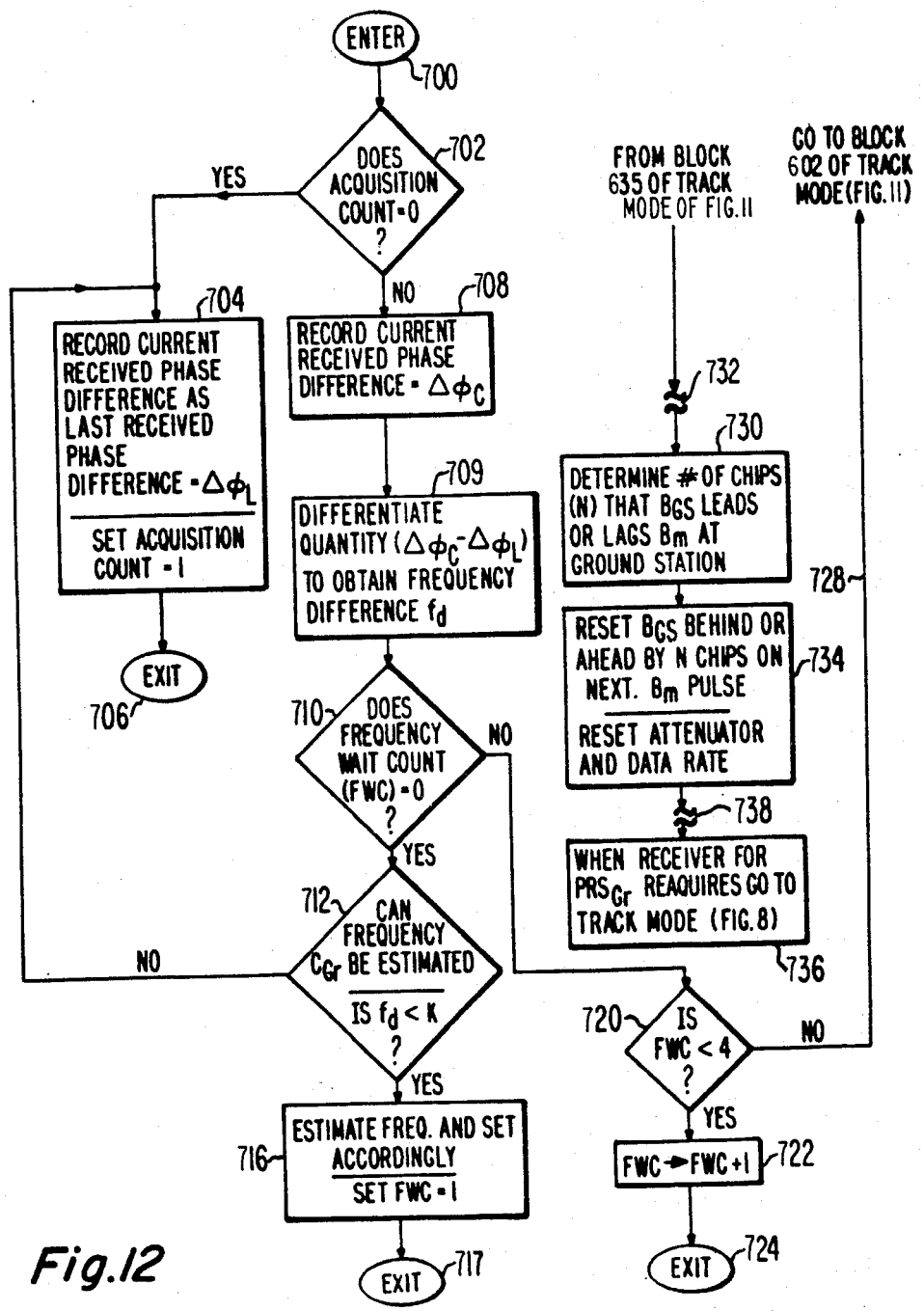
FIG. 12 is another flow chart showing the method of initially acquiring chip and bit synchronization in the system after the system is initially activated.

When the equipment is initially turned on, it is necessary to obtain initial synchronization between $C_M$ and $C_A$ and between $B_M$ and $B_A$. During this initial period, identified as the acquisition period, the steps outlined in the flow chart of FIG. 12 are employed. The first step, after entry via step 700, is to check the acquisition count in a designated acquisition counter in decision step 702. If such count is 0, then the signal (attenuated for reasons to be discussed later) is processed as indicated in step 704 by recording the received phase difference, designated as $\Delta\phi_L$, and which is the difference between the $C_M$ and $C_A$ in terms of a value which is representative or, in the present case, indicates directly the phase difference $\Delta\phi_L$ in degrees. The program then exits through exit step 706 and re-enters step 700 0.1 second later. During the next execution of the logic of FIG. 12 the acquisition count is 1 and the currently received phase difference $\Delta\phi_C$ is recorded, as shown in step 708. Next, in step 709, the difference between $\Delta\phi_L$ and $\Delta\phi_C$ is taken to obtain the frequency difference $f_d$. Note that the rate of change of phase is the definition of frequency.

Next, in decision step 710 the frequency wait count (FWC) is checked. If FWC is 0, then the logic moves to decision step 712 which determines if the frequency of $C_A$ can be estimated, which determination depends on the value $f_d$. If $f_d$ is less than some predetermined frequency K then the response is yes and the frequency is estimated as shown in step 716, and the frequency wait count (FWC) is set equal to 1. The program then exits through step 717 and re-enters step 500 0.1 second later.

If the frequency cannot be estimated because $f_d$ is greater than K, as indicated in decision step 712, then the currently received phase difference $\Delta\phi_C$ is stored, as indicated in step 704, and becomes the new last received phase difference $\Delta\phi_L$.

This process continues with each new currently received difference $\Delta\phi_C$ becoming the last received phase difference $\Delta\phi_L$ and differentiation of the quantity $\Delta\phi_C$ minus $\Delta\phi_L$ calculated until $f_d$ is less than K and the frequency can be estimated.

The reason for not acting on changes that are too large is that such phase changes are mathematical rather than real. For example, if $\Delta\phi_L = -179°$ and $\Delta\phi_C = +179$ the numerical phase change is large $(179-(-179)=358)$ but in reality it is only 2°. Instead of acting the system waits until it has moved away from this discontinuity.

The next time the loop of FIG. 9 is processed the decision step 710 will note that FWC is equal to 1 and the logic will go to decision step 720 where it will be determined if FWC<4. If FWC<4, then the logic will go to step 722 where FWC is incremented and the logic exited via step 724 to re-enter step 700 0.1 seconds later.

The foregoing process is continued until FWC=4 at which time decision step 720 will direct the logic to go to step 602 of the track mode of FIG. 11. The signal will then be processed in exactly the same manner as discussed in connection with the discussion of FIG. 11 until the phase difference $\Delta\phi$ between $C_M$ and $C_A$ enters the dead zone, as indicated by decision step 602. Under such circumstance the decision step 603 will recognize that the system is in the acquisition mode and will direct the program to go back to step 730 of the acquisition mode of FIG. 12.

Steps 730, 734, and 736 of FIG. 12 will synchronize $B_M$ with $B_A$. More specifically, after allowing for a round trip transit time to the satellite and back to the SES, indicated by break 732, step 730 will determine the number of chips (N) that $B_A$ leads or lags $B_M$ at the SES. This is done simply by counting the number of chip periods that occur between $B_M$ and $B_A$.

The bit clock pulse phase is then reset by that number of chip periods either behind or ahead of $B_M$ at the next $B_M$ pulse so that when $B_A$ is transmitted to the satellite and then returned it will be in phase with $B_M$ (at the MES). Also, as indicated in step 734, an attenuator 513 of FIG. 6 is removed from the SES logic and the data rate is reset. Next, after another round trip transit time or, more precisely after another 0.8 seconds has elapsed, as indicated by break 538 in FIG. 12, step 736 directs the logic to enter the track mode of operation of FIG. 11.

It is to be noted, that attenuator 513 of FIG. 6 is provided to lower the energy level during acquisition so that it will not interfere significantly with on-line transmission and reception by other stations.

What is claimed is:

1. In a data transmission system comprising a plurality of small earth stations (SES), a master earth station (MES), and a satellite, a system for transmitting data from a first SES to said MES via said satellite in a first transmission hop and then from said MES to a second SES via said satellite in a second transmission hop and comprising:

a transmitter and a receiver at said first and second SESs for transmitting and receiving a string of time synchronous pseudo random sequence (PRS) signals (PRS$_{SES}$) with periodic data pauses therein and with each PRS signal being uniquely coded to each SES, and with each PRS signal representing a data bit of chip rate C and having a bit rate B;

comparing means at said MES for comparing C and B of each PRS signal received from each SES with the chip and bit rate $C_M$ and $B_M$ of a PRS signal transmitted from the MES and received back from the satellite by the MES to generate an error correction command (ECC) signal which defines the instantaneous amount and direction of phase difference between the C and the B of the PRS generated by each SES and $C_M$ and $B_M$, respectively; and means for transmitting said ECC signal to said first SES during the pause period of the PRS signal generated by said second SES;

said first SES comprising logic responsive to said ECC signal transmitted from said MES to correct the phase of C and B of the PRS signal generated at said first SES to be synchronized with $C_M$ and $B_M$ at the time of arrival of C, B, $C_M$, and $B_M$ at the MES.

2. A transmission system as in claim 1 in which each SES comprises means for generating a train of $M=N-X$ data bits at a bit rate equal to N bits per second followed by a pause period of X data bit periods where $M>>X$; and in which said MES further comprises:

means for detecting the pause period in each PRS$_{SES}$; and means for inserting said ECC signal into the pause period of said PRS signal generated by said second SES for subsequent transmission to said first SES; and in which said first SES comprises logic for detection of said ECC signal transmitted in the pause period of the PRS transmission from said second SES via the MES and the satellite and the decoding of the ECC signal contained therein to correct the phase of the chip and bit rates $C_A$ and $B_A$ of said first SES.

3. A communication network comprising:

a satellite;

a master earth station (MES);

a plurality of small earth stations (SES) each comprising logic for generating and transmitting in a first transmission hop to said MES via said satellite a stream of pseudo random sequence (PRS) signals PRS$_{SES}$ having a repetition rate B$_{SES}$ and each consisting of a plurality of chips occurring at a chip rate C$_{SES}$, and arranged in patterns unique to said each SES, and with each PRS signal representing a bit and further with said streams of PRS signals each having periodic pause periods therein consisting of a predetermined number of bit periods for receiving and carrying error correction command (ECC) signals;

said MES comprising:

means for generating, transmitting and then receiving back from said satellite a PRS signal PRS$_M$ having a chip and bit clock rate $C_M$ and $B_M$, respectively;

said MES further comprising means for receiving said PRS signals (PRS$_{SES}$) and for generating an ECC signal in response to the phase difference between $C_M$ and the $C_{SES}$ of each SES and the phase difference between $B_M$ and the $B_{SES}$ of each SES indicating the amount and direction of such phase differences;

said MES further comprising logic for detecting and identifying the occurrence of the periodic pause period of each SES and for inserting in such pause periods the ECC signal required for the SES to which the transmissions from said each SES are addressed; and each of said SESs being responsive to an ECC addressed thereto to correct the phases of the $C_{SES}$ and the $B_{SES}$ of the $PRS_{SES}$ unique thereto so that said $C_{SES}$ and said $B_{SES}$ are synchronized with $C_M$ and $B_M$, as returned from the satellite, at the MES.

4. A spread-spectrum communications arrangment comprising:

a first earth station including a first spread spectrum transmitter transmitting in a first frequency band a first spread spectrum signal carrying first information encoded with a first pseudorandom code, and a first spread spectrum receiver operating in a second frequency band and responsive to a second spread-spectrum signal encoded with a second pseudorandom code for receiving information;

a second earth station including a second spread spectrum transmitter transmitting in said first frequency band a third spread-spectrum signal carrying second information encoded with a third pseudorandom code and a second spread spectrum receiver operating in said second frequency band and responsive to a fourth spread-spectrum signal encoded with a fourth pseudorandom code for receiving information;

an earth satellite including transponding means operating in said first and second frequency ranges for receiving a plurality of spread-spectrum signals in said first frequency band from earth stations, and for retransmitting said plurality of spread-spectrum signals in said second frequency band to earth stations, whereby retransmission of a plurality of spread-spectrum signals with unsynchronized bit and chip rates undesirably results in interference which reduces the utility of the system;

a master earth station including a third spread-spectrum receiver operating in said second frequency band and responsive to said first and third pseudorandom codes for receiving said first and second information, and also including a third spread-spectrum transmitter operating in said first frequency band for transmitting a fifth spread-spectrum signal in said first frequency band, the transmissions of said fifth spread-spectrum signal being encoded for retransmitting said second information with said second pseudorandom code for making said second information from said second earth station available to said first earth station, and for retransmitting said first information with said fourth pseudorandom code for making said first information from said first earth station available to said second earth station;

a master earth station fourth transmitter for transmitting to said earth satellite at said first frequency a master synchronization signal having bit and chip rates for retransmission of said master synchronization signal in said second frequency band to said first, second and master earth stations;

first synchronization error signal generating means coupled for receiving from said satellite said master synchronization signal and said first spread spectrum signal, for generating a first synchronization control signal from the instantaneous difference in chip and bit synchronization therebetween;

first earth station synchronization means responsive to said first synchronization control signal for correcting said bit and chip rates of said first spread spectrum transmitter in response to said first synchronization control signal to maintain bit and chip synchronism of said first spread spectrum signal transponded into said second frequency band in instantaneous synchronism with the bit and chip rates synchronism of said master synchronization signal in said second frequency band;

second synchronization error signal generating means coupled for receiving from said satellite said master synchronization signal and said third spread spectrum signal, for generating a second synchronization control signal from the instantaneous difference in chip and bit synchronization therebetween; and second earth station synchronization means responsive to said second synchronization control signal for correcting said bit and chip rates of said second spread spectrum transmitter in response to said second synchronization control signal to maintain bit and chip synchronism of said second spread spectrum signal transponded into said second frequency band in instantaneous synchronism with the bit and chip rates of said master synchronization signals in said second frequency band, whereby bit and chip synchronization is maintained between said first and second spread-spectrum signals transponded into said second frequency band thereby reducing said undesirable interference, whereby if said first and second synchronization error signal generating means are located at said first and second earth station locations, respectively, additional receivers are required at said first earth station for receiving from said satellite said master synchronization signal and said first spread spectrum signal, and at said second earth station for receiving from said satellite said master synchronization signal and said third spread spectrum signal, thereby undesirably increasing the number of receivers required at each earth station, wherein the improvement lies in that:

said first and second synchronization error signal generating means are located at said master earth station whereby a single master synchronization signal receiving means is used in common and thereby reduces to one the number of receivers required for receiving said master synchronization signal, and also eliminating the need for said additional receivers required at said first earth station for receiving said first spread spectrum signal and at said second earth station for receiving said third spread spectrum signal.

5. An arrangement according to claim 4 wherein said first and second earth station synchronization means are located at said first and second earth stations, respectively, said arrangement further comprising multiplexing means whereby said first synchronization control signal is sent from said master earth station to said first earth station by multiplexing with said second information.

6. An arrangement according to claim 5 wherein said multiplexing means comprises time-division multiplexing means.

* * * * *